Jan. 16, 1962  C. STRACHEY ET AL  3,017,090
OVERFLOW CONTROL MEANS FOR ELECTRONIC DIGITAL COMPUTERS
Filed Jan. 23, 1956  11 Sheets-Sheet 1

INVENTORS:
CHRISTOPHER STRACHEY
DONALD B. GILLIES

By: Stevens, Davis, Miller & Mosher
Attorneys

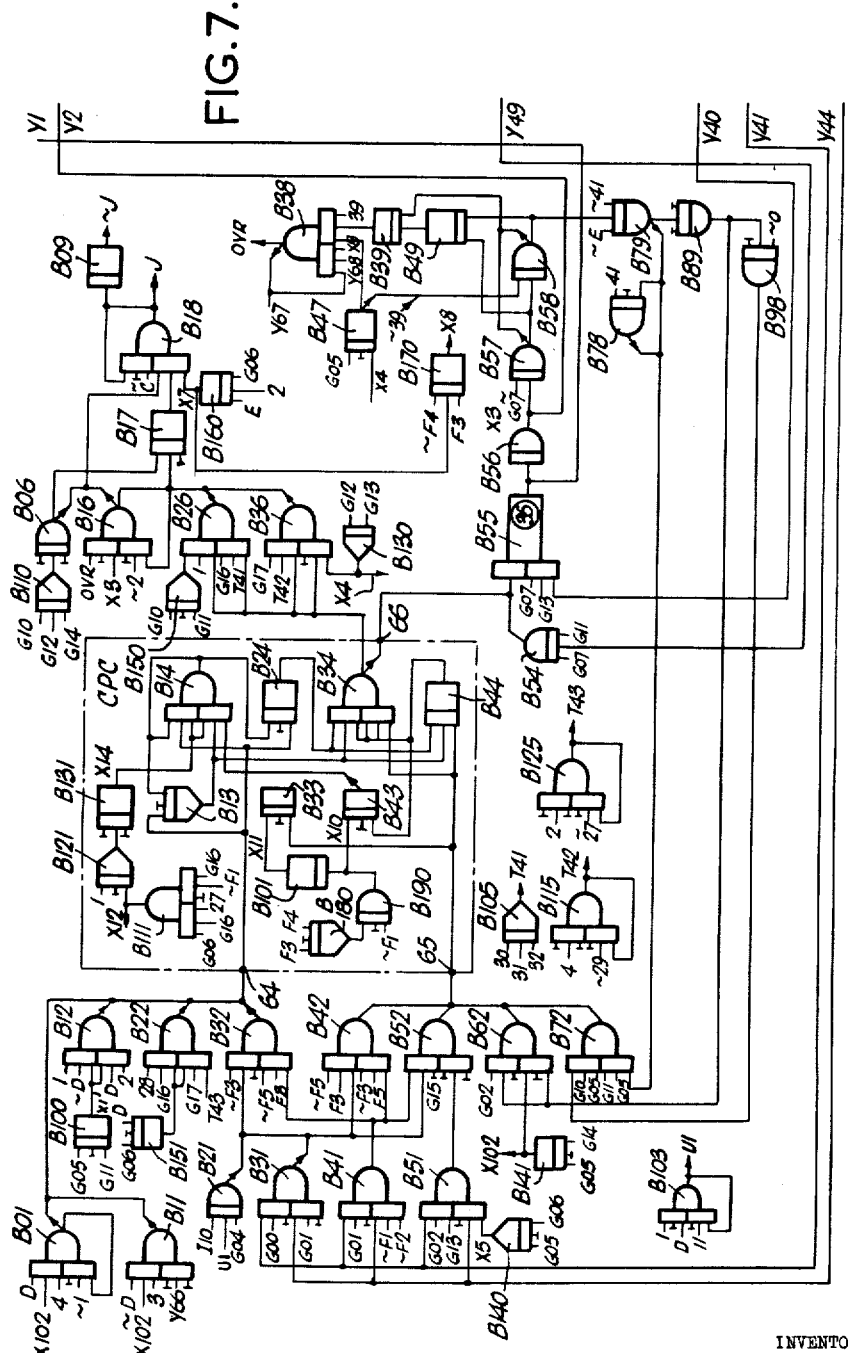

INVENTORS:
CHRISTOPHER STRACHEY
DONALD B. GILLIES

United States Patent Office 3,017,090
Patented Jan. 16, 1962

3,017,090
OVERFLOW CONTROL MEANS FOR ELECTRONIC DIGITAL COMPUTERS
Christopher Strachey, London, England, and Donald Bruce Gillies, Toronto, Ontario, Canada, assignors, by mesne assignments, to International Business Machines Corporation, New York, N.Y., a corporation of New York
Filed Jan. 23, 1956, Ser. No. 560,830
Claims priority, application Great Britain Jan. 24, 1955
12 Claims. (Cl. 235—153)

This invention relates to electronic digital computers and is more particularly, although not exclusively, concerned with machines which operate wholly or mainly in the serial mode with both number and order words in the form of electric pulse signal trains.

One object of the invention is to provide an improved arrangement of apparatus by which the event of an answer number signal getting out of range is automatically detected and appropriate steps taken to safeguard the subsequent operation of the machine against the possible introduction of a resultant computation error. Another object of the invention is to provide arrangements by which the separately computed halves of a double-length answer number signal may be corrected as to their respective number and sign values. A further object of the invention is to provide arrangements for effecting rounded right shift, i.e. reduction of the radix power value of the digits of a number signal with appropriate rounding-off of the answer signal in accordance with the values of the eliminated digits.

In accordance with one feature of the invention, the machine includes arrangements for detecting over-flow of a number-representing signal beyond its most significant or sign digit and control means, governed by said over-flow detecting arrangements, for effecting an appropriate control of the manner of subsequent machine operation in dependence upon the type of operation during which such over-flow has occurred.

In one particular embodiment said control means, which are governed by the over-flow detecting arrangements, is arranged to cause stoppage of the machine operation when over-flow occurs during a division operation, to cause interpretation of the over-flow arithmetically during other operations and to ensure limitation of the manner of subsequent operation of the machine so as to prevent transfer of the possibly erroneous answer in which over-flow occurred to a particular storage section of the data storage means of the machine.

In accordance with another feature of the invention the machine, which includes a control system for receiving an order signal and providing appropriate control potentials for governing the manner of subsequent operation of the machine upon at least one number signal in accordance with the form of such order signal, is provided with means for deriving such number signal from a part of the order signal currently effective within said control system.

In order that the nature of the invention may be more readily understood one particular embodiment thereof will now be described with reference to the accompanying drawings, in which:

FIG. 1 is a block schematic diagram of those elements of the machine which are principally concerned with the present invention.

FIG. 2 comprises a chart diagram showing the word formations used in the machine.

FIGS. 6a, 6b, 6c and 6d form a group of more detailed block schematic diagrams illustrating the arrangements of the high speed computing store.

FIG. 7 is a similar more detailed block schematic diagram of the arrangements of the computing unit.

Figure 8:
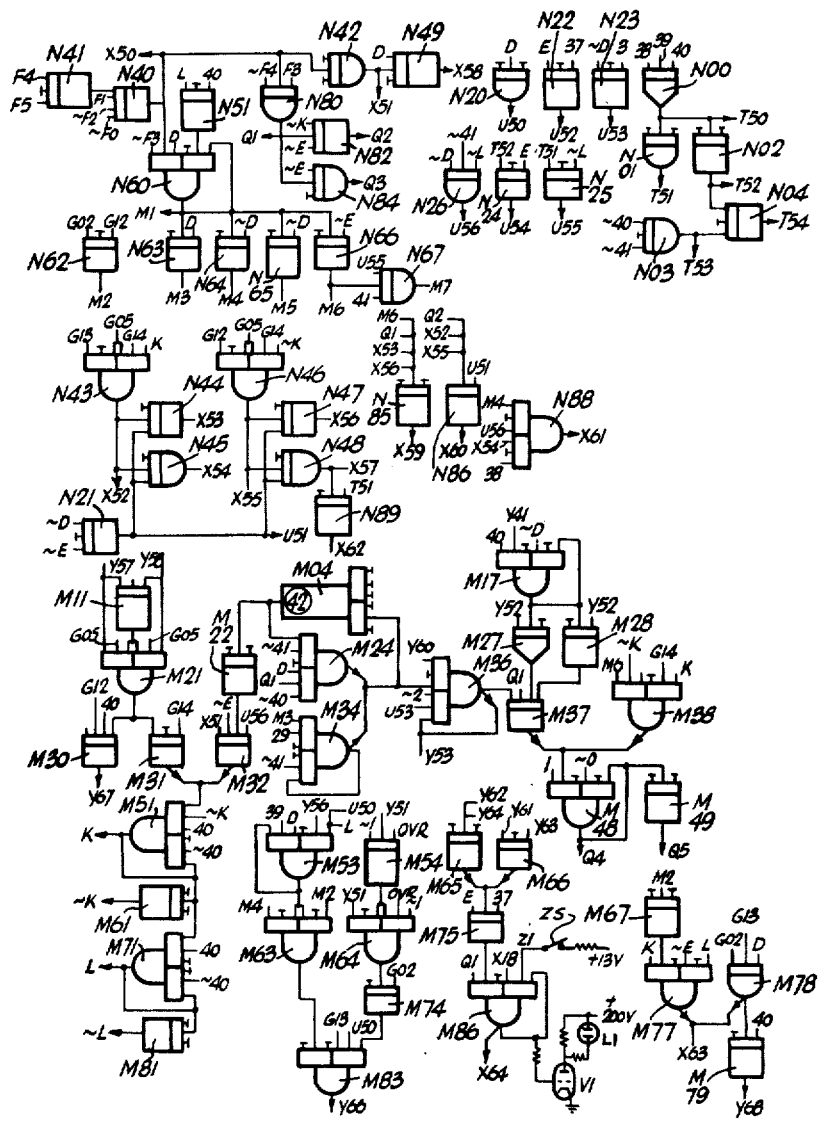
Figure 9:
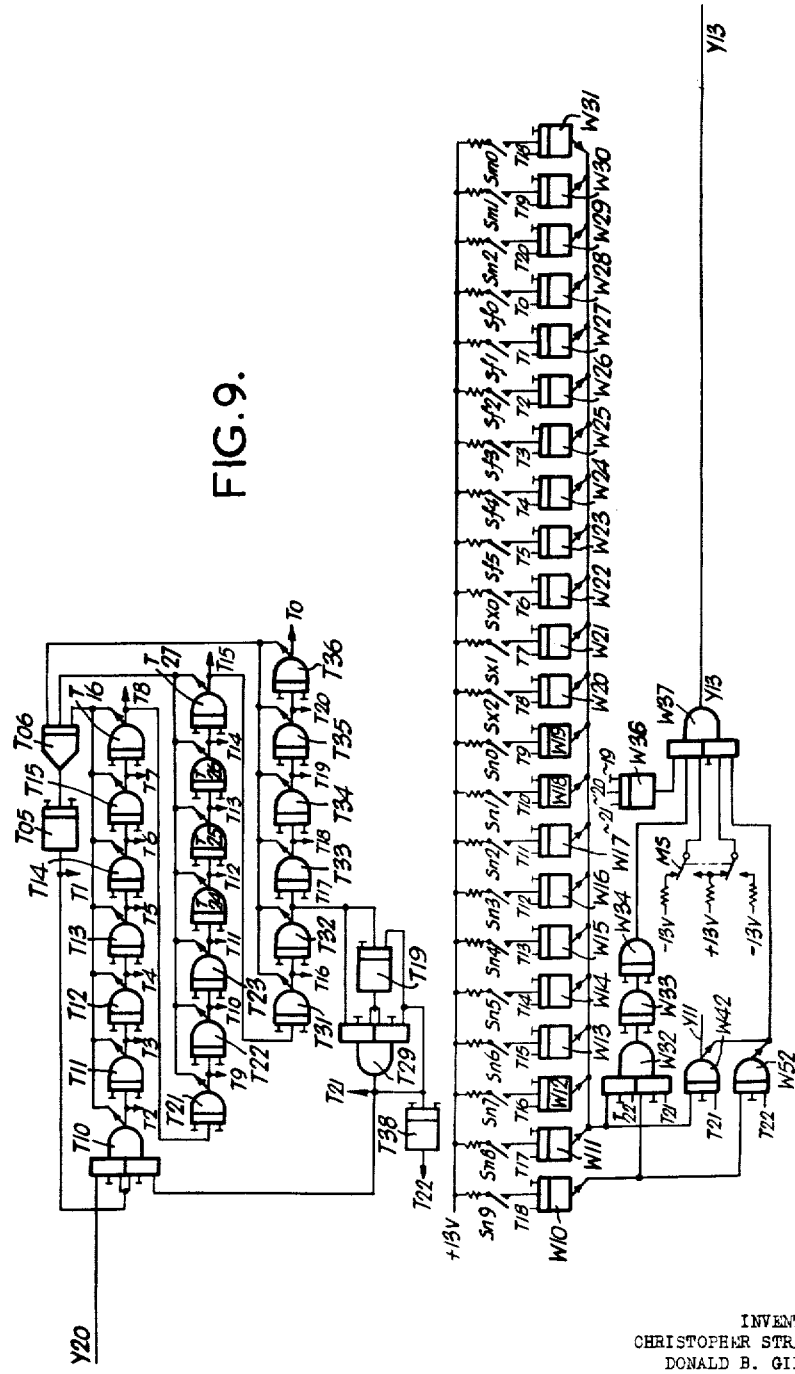

FIG. 8 is a more detailed block schematic diagram of certain waveform generating arrangements concerned primarily with the control of the accumulator registers ACR6 and ACR7 of the high speed computing store while FIG. 9 is a more detailed block schematic diagram of the arrangements for generating certain timing waveforms and associated arrangements by which a signal representing a half word or order may be set up on manually operable hand switches for providing an input to the machine.

FIGS. 4, 6a, 6b, 6c, 6d, 7 and 9 are drawn whereby they may be arranged with common signal transfer busbars in contiguous relationship to form a single composite diagram.

GENERAL ARRANGEMENT OF MACHINE

Figure 1:
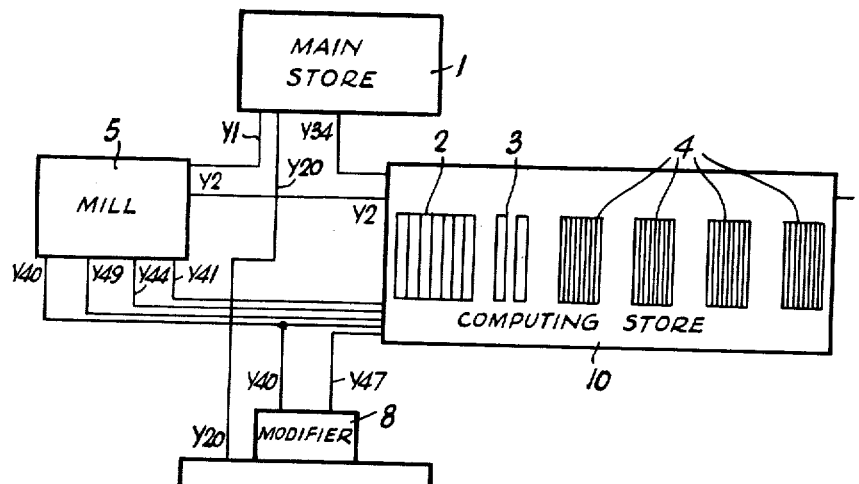

Referring first to the block schematic diagram of FIG. 1 the general organization of the machine is one which comprises a main or low access-speed data word store 1, a high-access speed computing store 10 consisting of a group of single-word accumulator registers 2, a number of, e.g. four, groups of further single-word high-speed registers 4 and also a group 3 of further addresses which are equivalent to registers but which are actually sources of or destinations for signals such as constant-representing signals, connections to input or output apparatus and the like.

The machine also includes a computing unit or mill 5 and a control system 9, the signal entry to which is by way of a modifier 8.

Signals are applied from the main store 1 to an input of the computing store 10 over bus bar Y34 while signals from the output of the computing unit 5 to another input of such computing store 10 are fed over bus bar Y2. Operand-representing signals from the computing store 10 can be fed to the computing unit 5 over any one or more of the bus bars Y40, Y41, Y44 and Y49 while signals from such computing store 10 can also be fed into the control system 9 through modifier 8 over a branch of bus bar Y40 and over a further bus bar Y47.

It is to be noted that the rectangle defining the control system 9 must be regarded as symbolic only since the various elements thereof, which control the machine rhythm and the routing of signals between the various parts of the machine through gate and like devices, are necessarily located in suitable positions throughout the machine and not grouped together as is suggested by such symbol.

Broadly the machine operates with a regular rhythm consisting of a so-called A period when one, the A, order of an order pair contained in each order word is obeyed followed by a so-called B period when the other, the B, order of the order pair is similarly obeyed and a subsequent C period when the next order word is selected and fed into the control system. In both the A and B periods the order, A or B, which has previously been read as part of an order word out of one of the high-speed register groups 4 into the control system 9, is normally obeyed by the simultaneous selection of two registers, one of which is one of the accumulator registers in group 2 and the other of which is one of the high-speed registers in one of the groups 4 or one of the sources 3 or any other one of the accumulator registers 2, for use as the registers to be associated with the computing unit 5. Signals from the selected registers or addresses are then fed simultaneously to the computing unit 5 over two of the bus bars Y40, Y41, Y44 and Y49. After the lapse of one beat period during which the necessary computing operation is carried out with such operand-representing signals within the computing unit 5, the output of the latter is fed back to the computing store 10 over bus bar Y2 for insertion into the chosen register therein.

MACHINE RHYTHM

The machine operates with number and order word signals transmitted in serial form as electric pulse signal trains in which binary value "1" is denoted by a positive-going (approximately 13 v.) pulse within any given digit interval, and in which binary value "0" is indicated by the absence of such a pulse and a sustained potential of below earth. Each minor cycle or beat for signalling a word is of 42 digit intervals length as indicated at 0, 1, 2 . . . 41 in FIG. 2a, each digit interval being of 3 microseconds duration. Each word interval or beat time is thus 126 microseconds long.

Figure 2:
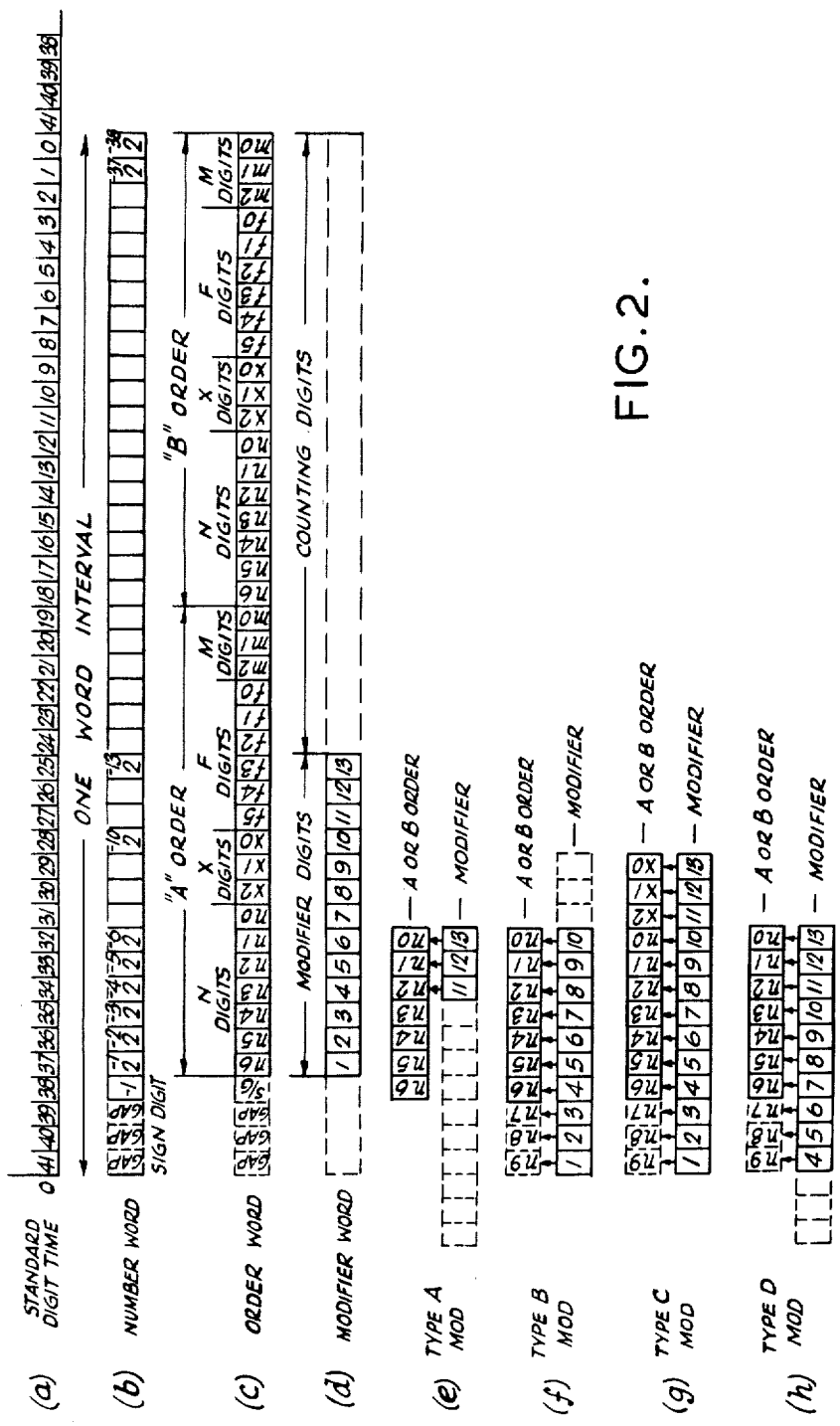

Number words contain 39 significant digits signalled in ascending power order during the first 39 digit intervals 0, 1 . . . 38 of each signal train. The remaining 3 digit intervals at the most significant end of the number word constitute gap digits separating the significant digits of one word from those of the next. These gap digits are normally of value "0" and inoperative but may, on occasion, accommodate digit values caused by extension of a number for certain specific purposes. The form of a number word is illustrated in FIG. 2b from which it will be seen that the least significant or first occurring digit in digit time 0 (standard machine time) is assumed to have binary value $2^{-38}$ whereas the most significant digit occurring in digit time 38 (standard machine time) constitutes a sign digit of value $-1$. The next to most-significant digit lying immediately before the sign digit in digit time 37 is of value $2^{-1}$, i.e. of value $+\frac{1}{2}$.

Each order word, shown in FIG. 2c, comprises 39 successive digits also but contains two separate orders known as the A and B orders respectively. Each order is of 19 digits length, the B order being accommodated in the first 19 digit intervals, 0 . . . 18, of the signal train and the second or A order in the next 19 digit intervals, 19 . . . 37. The remaining digit in digit interval 38 constitutes what is known as a "stop-go" digit. If this digit is of binary value "1" it means there will be no stoppage of the machine operation before obeying either of the orders contained in the order word but if it is of binary value "0" it provides a facility for an optional stop before obeying the first or A order of an order word. The remaining digit intervals 39, 40 and 41 are normally blank and constitute gap-digits for separating the significant digits of one word from those of the next. On occasion, however, they may be used to accommodate an extension of the A order.

Each of the A and B orders has a similar form and contains, in time order commencing from the initial or lowest significant end, 3 so-called M digits $m0, m1, m2$, followed by 6 so-called F digits $f0, f1, f2, f3, f4, f5$. These are followed by 3 so-called X digits $x0, x1, x2$ and the order is completed by a group of 7 so-called N digits $n0, n1, n2, n3, n4, n5, n6$.

The M digits define the address, in the group of accumulator registers 2 of the high-speed computing store 10 of any required modifier word to be used for altering either the subsequent N digits only or both the N and X digits of the same order. It is also possible to alter the X digits only by the modifier word. The F digits define the particular function which is to be performed by the machine in execution of the order. The X digits define, inter alia, the particular register in the first block 2 of accumulator registers which is to be used as an accumulator register associated with the computing unit 5 while the N digits define, inter alia, the address in the storage system where one operand is to be obtained or delivered.

Each of the aforementioned A and B periods has a minimum length of two beats consisting of a first or D beat and a final or E beat. There may, however, be other intervening beats between such D and E beats dependent upon the type of operation which is being performed.

In many respects the machine to be described resembles that referred to in co-pending application No. 418,104 of Andrew St. Johnson, filed March 23, 1954, now patent No. 2,895,671, (EB. 118) to which cross reference will hereinafter be made as "copending application A."

As in the machine described in such copending application A, the present machine includes a source of "clock" pulses occurring one in each digit interval and consisting of a positive-going pulse lasting for the major part, e.g. approximately 2 microseconds, of each digit interval. The arrangements for providing these "clock" pulses and also for providing a related series of "reset" pulses which each consist of a sharp negative-going pulse coincident with the trailing edge of each "clock" pulse, resemble those of the pulse generators PGA shown in FIG. 11A of the aforesaid copending application A and wherein a separate recording track on a magnetic drum store forming the main store 1 provides a continuous sine wave output which is fed through an amplifier to a pulse squaring circuit, the square pulse output of which provides, after further amplification, the aforesaid "clock" pulses. The same square wave output from the pulse squaring circuit is applied to a pulse generating circuit including a differentiating circuit followed by an over-biased amplifier to select each negative-going edge of the aforesaid square pulse waveform. The resultant negative-going spike waveform is used, after further amplification, as the aforesaid "reset" pulse waveform.

Before commencing a more detailed description of the machine illustrated in the drawings, a brief reference will be made to the form of the various block schematic symbols used in such drawings.

Figure 6A:
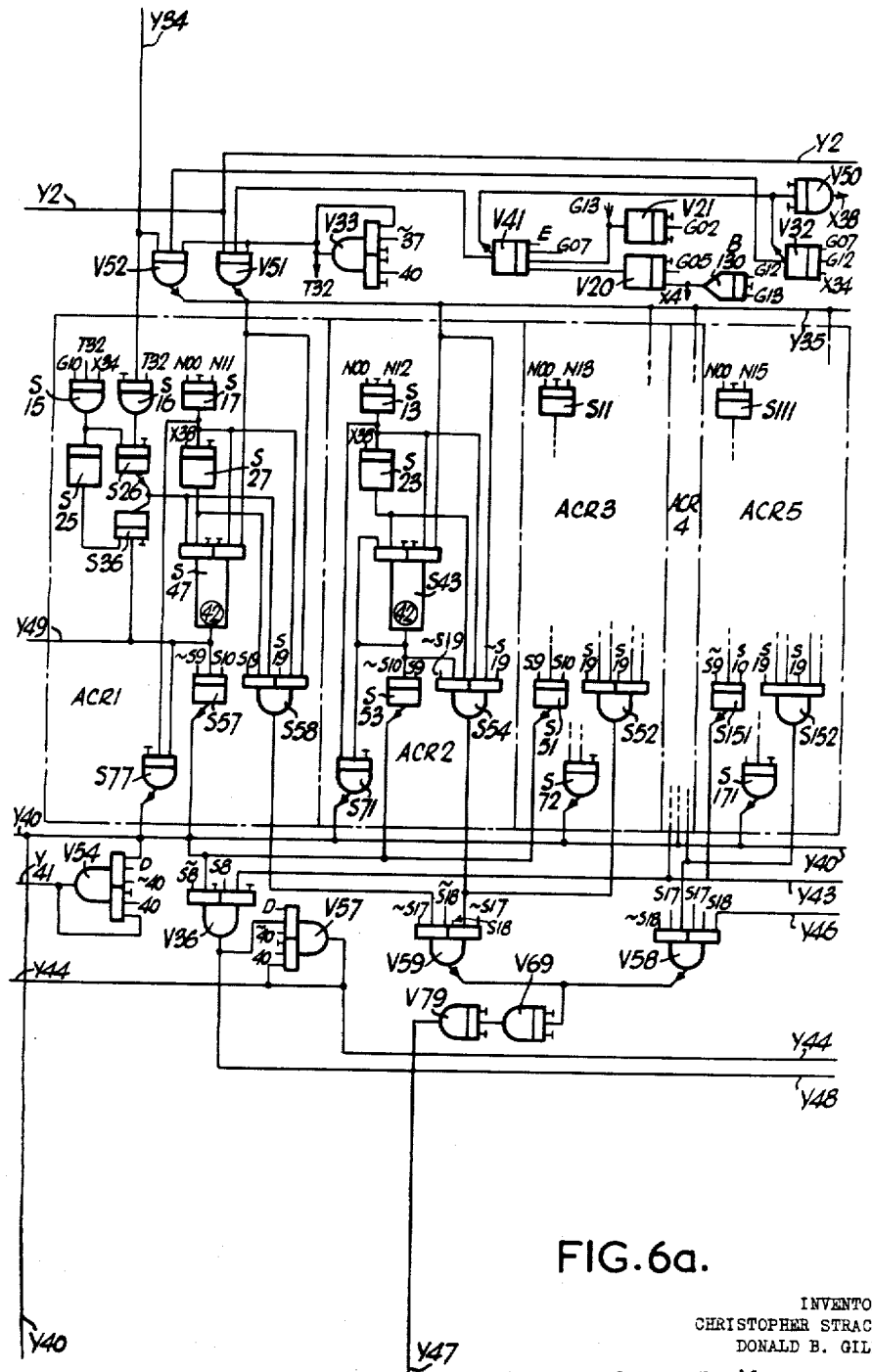

The symbol used, for example, at S26 in FIG. 6a denotes a multiple input "AND" type gate circuit such as is shown in detail in FIG. 4B of the aforesaid copending patent application A and serves to provide a positive-going output on its output leads only upon coincidence of positive-going inputs on each of its used input leads. For brevity such a device will hereinafter be referred to as a "gate."

The symbol used, for example, at S15 in FIG. 6a denotes a gate followed by a delay device imposing a time delay of 1 digit interval of the machine rhythm and provides a correspondingly delayed positive-going output on its output leads only when each of the input leads to the gate which are in use are supplied with simultaneous positive-going inputs. A circuit arrangement of such a device is shown by the combination of FIG. 4B and FIG. 2B of the aforesaid copending patent application A. For brevity such a device will hereinafter be referred to as a "unit delay."

The symbol shown, for example, at S58 in FIG. 6a denotes a unit delay preceded by two alternatively operable multiple input "AND" gate circuits and provides a positive-going output on its output leads only when simultaneous positive-going inputs are applied to the used input leads of either one of the gate circuits. A circuit arrangement for such a device is shown in detail in FIG. 3B of the aforesaid copending patent application A. For brevity such a device will hereinafter be referred to as a "double-entry gated delay."

The symbol used, for example, at S25 in FIG. 6a denotes a multiple input "AND" gate circuit followed by an inverter circuit and provides an output which is normally positive-going except when a positive-going input is applied simultaneously to each of the used inputs of the gate circuit whereupon there is "0" representing or negative-going output from the inverter. A circuit arrangement for such a device is shown in detail in FIG. 3C of the aforesaid copending patent application A. For brevity such a device will hereinafter be referred to as an "inverter."

The symbol shown, for example, at B130 in FIG. 6a denotes a mixer or buffer device providing a positive-going output on its output lead when any one or more of its used inputs is supplied with a positive-going potential. A circuit arrangement for such a device is shown in detail in FIG. 5B of the aforesaid copending patent application A. For brevity such a device will hereinafter be referred to as a "mixer."

The symbol used, for example, at S47 in FIG. 6a denotes a delay line of extended length with its associated driving, amplifying and shaping valve circuits and which is preceded by two alternatively operable multiple input "AND" gate circuits whereby a positive-going output is obtained after the predetermined delay interval time set by the delay line only upon the occasion of simultaneous positive inputs to the used input leads of either one of the two input gate circuits. A circuit arrangement for such a device is provided by the arrangement of FIG. 3B, followed by FIG. 9B, followed by FIG. 6B, followed by FIG. 7B, followed by FIG. 8B of the aforesaid copending patent application A. The number of digit intervals of delay time provided by the complete device between input and output is either 35 digit intervals or 42 digit intervals of the machine rhythm and this number is denoted by the figure within a circle shown on the symbol. As will be understood such a device is capable of holding either 35 or 42 binary digit signals within its circuits. For brevity such a device will hereinafter be referred to as either a "35 interval delay line" or a "42 interval delay line."

Unused inputs of any gate circuit or the like are shown by a T-shaped free end and in practice these are actually left unconnected. Where only one input is used to a gate the gating function obviously does not exist. A number of cathode follower circuits are provided in the actual machine for the purpose of affording a sufficiently low impedance signal source but in the interests of clarity of description and drawings these have been omitted as they make no difference to the manner of operation. Other symbols employed in the drawings such as hand switches or key switches, resistors and capacitors are of the conventional form.

The legends attached to input and output leads denote the reference identifications of various control and other waveforms which have a normal or "off" level of below earth and an operative or "on" level which is positive to earth. These waveforms, in general, are identified as follows. Simple numerals define the respective pulses of a series of digit time pulses occurring in the different digit intervals of each beat. Thus the numeral "0" indicates the 0 digit time pulses each occurring in digit interval 0 of each beat and so on. These digit time pulses are generated in a manner similar to that shown in FIG. 11A of the aforesaid copending application A wherein pre-recorded signals in another separate address recording track on the magnetic drum of the main store 1 are read out and applied through suitable amplifier and squaring circuits to a delay line having a total delay time equal to one beat time, which delay circuit includes a multivibrator having an "on"-time period of about three-quarters of one word or beat time and a natural "off"-time of more than one word or beat time whereby such multivibrator circuit is always set by a particular output pulse provided in each address signal pre-recorded in the aforesaid separate address recording track. The multivibrator circuit provides a short output pulse once in every beat time and this is applied to a serial chain of unit delays, the respective outputs of which provide the different digit time pulses. The legend A denotes a waveform defining the multiple-beat A period for dealing with an A order, the legend B a similar waveform defining a similar multiple-beat B period for dealing with a B order and the legend C a further waveform defining the further period at the end of an operation cycle when the next order is being obtained. The A or B periods may have two or more successive beats dependent upon the type of order and the first of these known as the D beat is defined by waveforms denoted by the legend D. Similarly the legend E denotes waveforms which define the last beat of either an A or B period. The legend F refers to waveforms concerned with undecoded function or F digits of an order while waveforms bearing the legend G refer to those derived after partial decoding of the function digits. The legend I refers to waveforms derived from the outputs of the instruction delay line of the control system while the legend J relates to waveforms concerned with a so-called "jump" operation. The legends K and L refer to waveforms concerned with special beats, somewhat similar to the D and E beats noted above, in the case of multiplication or division operations only. The legend M refers to control waveforms arising during a multiplication operation while the legend Q refers to similar waveforms operable during a division operation. The legend N refers to waveforms derived from partial decoding of the N digits of an order while the legend R refers to waveforms derived from a partial decoding of order digits specifying track selection in the main store. The legend S refers to waveforms derived from the instruction delay line for certain order digits other than those of the function digits while the legend T refers to timing waveforms which are combinations of selected individual digit time pulses. The legend U refers to waveforms which are the combination of certain T waveforms with the beat waveforms A, B, C, K or L. The legend X refers to control waveforms derived from the function digits of an order while the legend Y is applied to conductors or bus bars which actually carry signal pulse trains. The legend Z refers to hand switch inputs.

Some waveforms are also made available in their inverse form, i.e. a form which is normally at the "on" or positive level falling to a negative or "off" level during those periods when the principal waveform is at its "on" level. Such inverse versions are denoted by the addition of the prefix "~" to the legend.

DESCRIPTION OF MACHINE

The main store 1

The main store 1, FIG. 1, is of the magnetic drum type in which information is stored in 36 channels.

Each channel contains separate storage locations for 128 words arranged as 16 blocks of 8 words and arrangements (not shown) are provided whereby words may be transferred to or from the main store either individually or in blocks of 8.

High speed computing store

The arrangements of the high-speed store 10, FIG. 1, are shown in FIGS. 6a, 6b, 6c and 6d and comprise a first block 2 of 7 accumulator registers, four further blocks 4 each of 8 high speed storage registers and a group 3 of other sources of and destinations for signals. In the interest of simplicity only selected elements of these blocks and groups are shown.

The first accumulator register ACR1 (address number 1) is shown in FIG. 6a. As this register has been described in detail in our copending application Ser. No. 560,829, filed January 23, 1956, now abandoned (NRDC. 162B), hereinafter identified as copending application B it will be only briefly referred to. It comprises a 42-interval delay line S47 provided with a regenerative loop completed through gate S36. Selection of this register is by the output from gate S17 which is controlled by outputs from the N-digit staticisors to be described later. One signal input to the delay line S47 is through gate S26, unit delay S16 and bus bar Y34 from the main store 1. A second input to the delay line S47 is from the computing unit 5 over bus bar Y2 and through unit delay V51. Unit delay S77 provides an output connection from the delay line S47 to output bus bar Y40 and also to double-entry gated delay V54 which operates to copy the form of signal existing in the sign digit position 38 of a signal into the next or 39 digit position. Its output supplies bus bar Y41.

A further output from the delay line S47 is through gate S37, double-entry gated delay V36 and a further double-entry gated delay V57 to the bus bar Y44. The last-mentioned double-entry gated delay also operates to extend the output signal by copying the signal in its sign digit position 38 once into the next or 39 digit position like the delay V54. The output from delay V36 is also applied directly over bus bar Y48 to double-entry unit delay P43 of the register ACR6 shown in FIG. 6b and referred to later.

A further double-entry gated delay S58 provides a direct connection from either the first or second signal inputs of the delay line S47 through to the output bus bar Y47 by way of another double-entry gated delay V59 and unit delays V69 and V79.

The further 4 accumulator registers ACR2, ACR3 . . . ACR5 are generally similar to the register ACR1 except for elimination of the input over bus bar Y34. The accumulator register ACR2 (address number 2) has been shown in full but only a brief indication of the input and output connections of accumulator registers ACR3 (address number 3) and ACR5 (address number 5) have been illustrated.

Figure 6B:
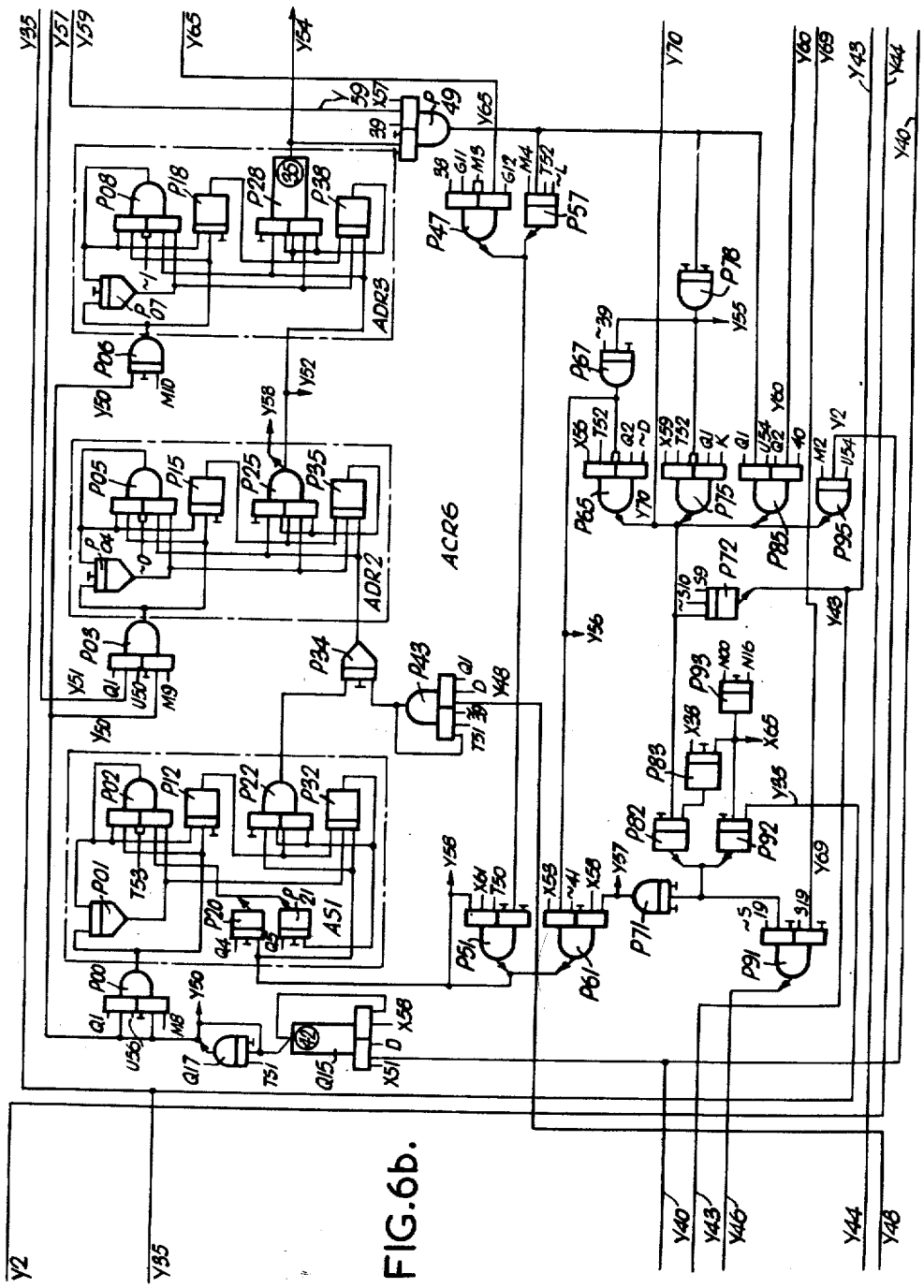

The accumulator register ACR6 (address number 6) is known as the "p" register, in addition to performing a normal word storage function like the preceding registers ACR1 . . . ACR5, is also complexly interconnected with the further register ACR7 and is used for holding one of the operands in a multiplication or a division operation. The detailed arrangements of this register ACR6 are shown in FIG. 6b.

These arrangements comprise a 35-interval delay line P28 which is arranged to form part of an adding circuit indicated within the chain-dotted line rectangle ADR3 and comprising the arrangement in known manner of further elements of double-entry gated delay P08, inverters P18, P38 and mixer P07.

One input to this adding circuit is by way of bus bar Y50 from unit delay Q17 through unit delay P06 while the second input is from the output terminal of a preceding adding circuit shown within the chain-dotted line rectangle ADR2 and comprising an assemblage of double-entry gated delays P05, P25, inverters P15, P35 and mixer P04 arranged in substantially identical manner to the adding circuit ADR3.

One input to this adding circuit ADR2 is by way of double-entry gated delay P03 either from the aforesaid bus bar Y50 or from the register ACR7 over the bus bar Y51, while the second input to such adding circuit, by way of mixer P34, is derived either from a double-entry gated delay P43 or from the output of a computing circuit shown within the chain-dotted line rectangle AS1.

Delay P43 is connected as a sign digit signal repeater similar to the delays V54 and V57, FIG. 6a, and is supplied over bus bar Y48 from delay V36, FIG. 6a.

The computing circuit AS1 comprises the elements of double-entry gated delays P02, P22, mixer P01, inverters P12, P32 and gates P20, P21 arranged in known manner to be capable of effecting either addition or substraction in accordance with the manner of control of the gates P20, P21. One input to this circuit AS1 is by way of double-entry gated delay P00 from the aforesaid Y50 bus bar while the second input is from the parallel connected outputs of double-entry gated delays P51, P61.

Delay P51 is arranged as a sign digit-signal repeater and is supplied with input signals from double-entry gated delay P47 or from gate P57, while delay P61 has one entry gate supplied from unit delay P67 and its opposite entry gate supplied from unit delay P71.

Figure 6C:
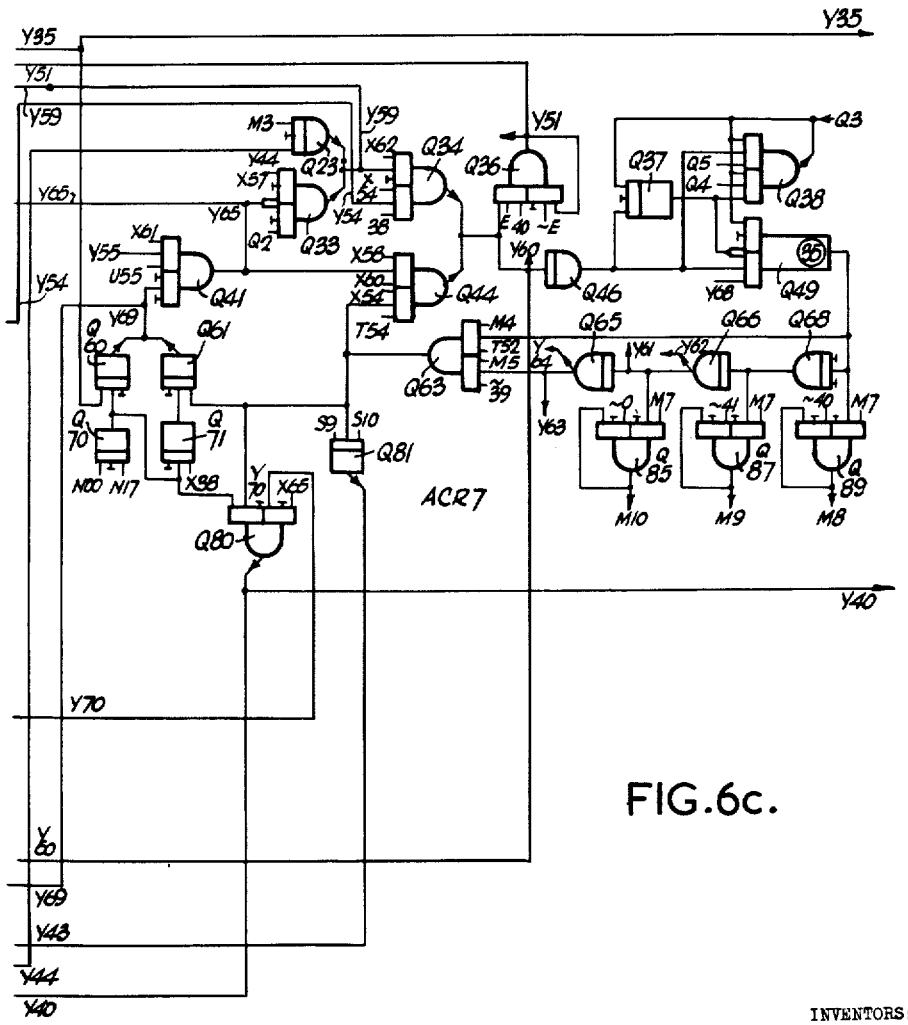

The output from delay line P28 is connected over bus bar Y54 to register ACR7, FIG. 6c, and is also applied to one entry gate of double-entry gated delay P49 whose opposite entry gate is supplied over bus bar Y59 from the register ACR7, FIG. 6c. The output from delay P49 is applied to gate P57, to unit delay P78 and also to one entry gate of double-entry gated delay P85. The output from delay P78 is applied to each entry gate of double-entry gated delay P75 and also to unit delay P67, the output of the latter, in addition to its connection to delay P61 referred to above, being also connected to each entry gate of double-entry gated delay P65.

The outputs from delays P65, P75, P85 are connected in parallel with that from unit delay P95 and are fed through bus bar Y70 to the register ACR7 and also to gates P72 and P82. Delay P95 is supplied over bus bar Y2 from the computing unit 5, FIG. 7.

The output of gate P72 is connected to bus bar Y43 leading to delay V36, FIG. 6a, while the output from gate P82 is connected in parallel with that from gate P92 and applied to delay P71 already referred to and also to one entry gate of double-entry gated delay P91. The output of the latter is connected to bus bar Y46 leading to delay V58, FIG. 6a. The opposite entry gate of delay P91 is supplied over bus bar Y69 from register ACR7, FIG. 6c. Gate P92 is supplied from input bus bar Y35 of the high speed store 10.

The arrangements of gate P57 and delays P78, P67, P65, P75 and P85 provide a plurality of separate paths between the output of the delay line P28 and the output bus bars Y43, Y46, Y57 or the input to computing circuit AS1 for the purpose of introducing different values of time delay according to particular requirements. In particular, by suitable choice from such paths, a regeneration or circulation loop can be established around the register having any one of a number of different delay time values.

A first loop path through gate P57 direct to delay P51 has a total delay time of 39 digit intervals only including a 1 digit interval delay in each of the circuits AS1 and ADR2. This is three digit intervals short of the standard word length time and provides a right shift of three digit places at each circulation of a number signal therearound. A second path by way of the delays P78 and P75, gate P82 and delays P71 and P61 has a delay time of 42 digit intervals whereby any word signal circulating around this path is held in unchanged timing relationship with reference to the machine rhythm. The further path by way of delays P78, P67 and P61 has a total delay time of 41 digit intervals, i.e. one short of the standard word length, whereby there is a progressive right shift of one digit interval for each circulation of a number signal therearound. Yet a further path by way of delays P78, P67, P65, gate P82 and delays P71 and P61 has a delay time of 43 digit intervals, i.e. one in excess of the normal word length time, whereby there is a left shift of one digit place for each circulation.

Also shown in FIG. 6b is a storage system for registering the multiplicand number signal during a multiplication operation or the divisor number signal during a division operation. This system comprises a 42-interval delay line Q15 arranged as a single word storage register by back coupling its output to one input gate. This delay line receives input signals from the bus bar Y40 and provides its output to the aforementioned bus bar Y50. A unit delay Q17 is associated with this output for the purpose of copying certain digits of the output signal into succeeding digit positions.

The detailed arrangements of the accumulator register ACR7 (address number 7) known as the "q" register and also used for holding one of the operands during a multiplication or a division operation, are shown in FIG. 6c.

These arrangements comprise a 35-interval delay line Q49 associated with a half adder/subtractor device formed by double-entry gated delay Q38 and inverted Q37 to receive signals arriving from unit delay Q46.

The output from delay line Q49 is applied directly to one entry gate of a double-entry gated delay Q63 and is also fed by way of unit delay Q68, Q66 and Q65 to the opposite entry gate of the same delay Q63.

The same output from the delay line Q49 is also applied to one entry gate of a double-entry gated delay Q89 which is arranged as a trigger circuit and provides the M8 waveform.

The output from delay Q68 is similarly applied to one entry gate of a double-entry gated delay Q87 which is also arranged as a trigger circuit and provides the M9 waveform.

The output from delay Q66 is likewise applied to one entry gate of a further double-entry gated delay Q85 arranged as a trigger circuit and providing the M10 waveform.

The output from delay Q63 is applied to one entry gate of each of double-entry gated delays Q44 and Q80 and also to gates Q61 and Q81. Delay Q80 has its output connected to output bus bar Y40 of the computing store 10 while gate Q81 has its output connected to bus bar Y43 leading to delay V36, FIG. 6a. The output of gate Q61 is connected in parallel with that of a further gate Q60 having one input connected to the input bus bar Y35 of the computing store 10.

The parallel connected outputs from gates Q60, Q61 are connected over bus bar Y69 to delay P91, FIG. 6b, and to one entry gate of double-entry gated delay Q41 whose output is connected to bus bar Y65 which feeds delay P47, FIG. 6b and to the entry gate of delay Q44 opposite to that receiving signals direct from delay Q63. Such output from delay Q41 is also applied to each of the entry gates of double-entry gated delay Q33. The opposite entry gate of delay Q41 is supplied over bus bar Y55 from delay P78, FIG. 6b.

The output of delay Q33 is connected in parallel with that from a unit delay Q23 which is supplied from the output bus bar Y44 of the computing store 10 and these outputs are then applied to the bus bar Y59 feeding delay P49, FIG. 6b, and also to one entry gate of a further double-entry gated delay Q34. The opposite entry gate of delay Q34 is supplied over bus bar Y54 from the delay line P28, FIG. 6b. The output from delay Q34 is connected in parallel with that from delay Q44 and these outputs are then applied over bus bar Y60 to delay P85, FIG. 6b, and to one entry gate of the delay M36 associated with the control waveform generating arrangements shown in FIG. 8. The same outputs from delays Q34, Q44 are fed also to one input gate of double-entry gated delay Q36 and also through unit delay Q46 to the input of the half adder/subtractor circuit arrangements associated with the delay line Q49 already referred to.

The delay Q36 is arranged as a trigger circuit by back coupling its output to its opposite input gate and provides an output signal which is indicative of the sign of a number stored in the "q" register ACR7.

The arrangements for generating the various control waveforms of the M, Q, K and L groups together with those of the T and U groups particularly associated with the registers ACR6 and ACR7 are shown in FIG. 8 and will be referred to as necessary later when description is given of the manner of operation under different types of order.

There is also an address number 0 which, being devoid of any connections, serves as a source of zero signal or a means of eliminating or erasing a word signal.

Figure 6D:
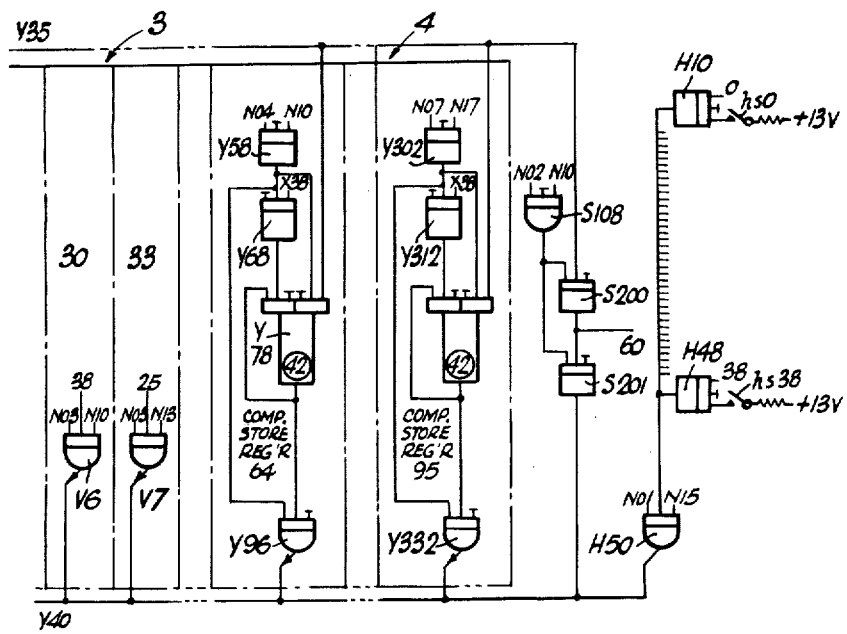

Each of the high speed computing store registers (whose addresses are number 64 . . . 95) in the four blocks 4, FIG. 1, each of 8 registers, is of identical form and of these only the first and last (address numbers 64 and 95) have been shown in FIG. 6d. As will be seen such registers comprise a 42-interval delay line such as that shown at Y78 for register 64. This delay line is controlled by the output from gate Y58. The latter also controls the signal input to the delay line from the bus bar Y35. The output from the delay line Y78 is made available through unit delay Y96 to bus bar Y40.

In addition to such first block of 7 accumulator registers and 32 computing store registers a number of further addresses are provided which act as destinations for or sources of signals such as those representing constants. Two of these are illustrated as so-called registers 30 and 33 and comprise, substantially, a unit delay such as shown at V6 for register 30. This unit delay is controlled by the digit staticisors and serves, when energised, to allow the passage of the 38 digit time pulse waveform therethrough. Such 38 digit time pulses coincide in timing with the sign digit of any number word pulse signal train held within a storage register and consequently the output from this register 30 is equivalent to a source of signals representing −1. Similarly the register 33 is provided with the 25 digit time pulse waveform which, when released by selection of this register by opening delay V7, is the equivalent of a source providing a signal of digit value $2^{-13}$.

In similar manner, unit delay H50, controlled by the N digit staticisors, serves to connect the outputs from a plurality of gates H10 . . . H48 to the bus bar Y40. These gates are each controlled by an associated hand switch $hs0$ . . . $hs38$ whereby a number signal is formed having a configuration for its different digits determined by the setting of such hand switches. In generally similar manner other of these auxiliary addresses or registers can provide for a connection to input or output mechanism for feeding in or reading out data from the machine. For example, the unit delay S108, controlled by outputs from the N digit staticisors, provides an output potential when operated which causes the opening of either of gates S200 or S201 by which a lead 60 serving as a combined input/output connection may be connected either to receive signals from the bus bar Y35 or to provide signals to the bus bar Y40. Such lead 60 is connected through other selector switch means, not shown, to both input and output mechanism such as a tape reader and a teleprinter.

*Computing unit*

The arrangements of the computing unit 5 are shown in detail in FIG. 7 and comprise a multi-purpose computing circuit of known form shown within the chain-dotted line rectangle CPC. This computing circuit includes the elements of double-entry gated delays B14, B34 and B111, inverters B24, B44, B101 and B131, gates B33 and B43, unit delay B190 and mixers B13, B121 and B180. These elements are arranged, in known manner, to operate to effect either addition or subtraction in accordance with the form of the various control waveforms supplied thereto. The circuit has a first input terminal 64 and a second input terminal 65 for receiving two operand-representing signals and an output terminal 66 from which an answer-representing signal is supplied.

Input terminal 64 is supplied with the parallel connected outputs from double-entry gated delays B01, B11, B12, B22 and B32. Input terminal 65 is supplied with the parallel connected outputs from double-entry gated delays B42, B52, B62 and B72.

Delay B32 has one of its entry gates supplied from the parallel connected outputs of unit delay B21 and double-entry gated delay B31, whereas the opposite entry gate of this delay B32 is supplied with the output from a double-entry gated delay B41.

Delay B42 has one of its entry gates supplied with the parallel connected outputs from delays B21 and B31, while its opposite entry gate is supplied with the output from delay B41.

Delay B52 has one of its entry gates supplied with both the parallel connected outputs of delays B21 and B31 and with the output from delay B41 while its opposite entry gate is supplied with the output from the double-entry gated delay B51.

Figure 4:
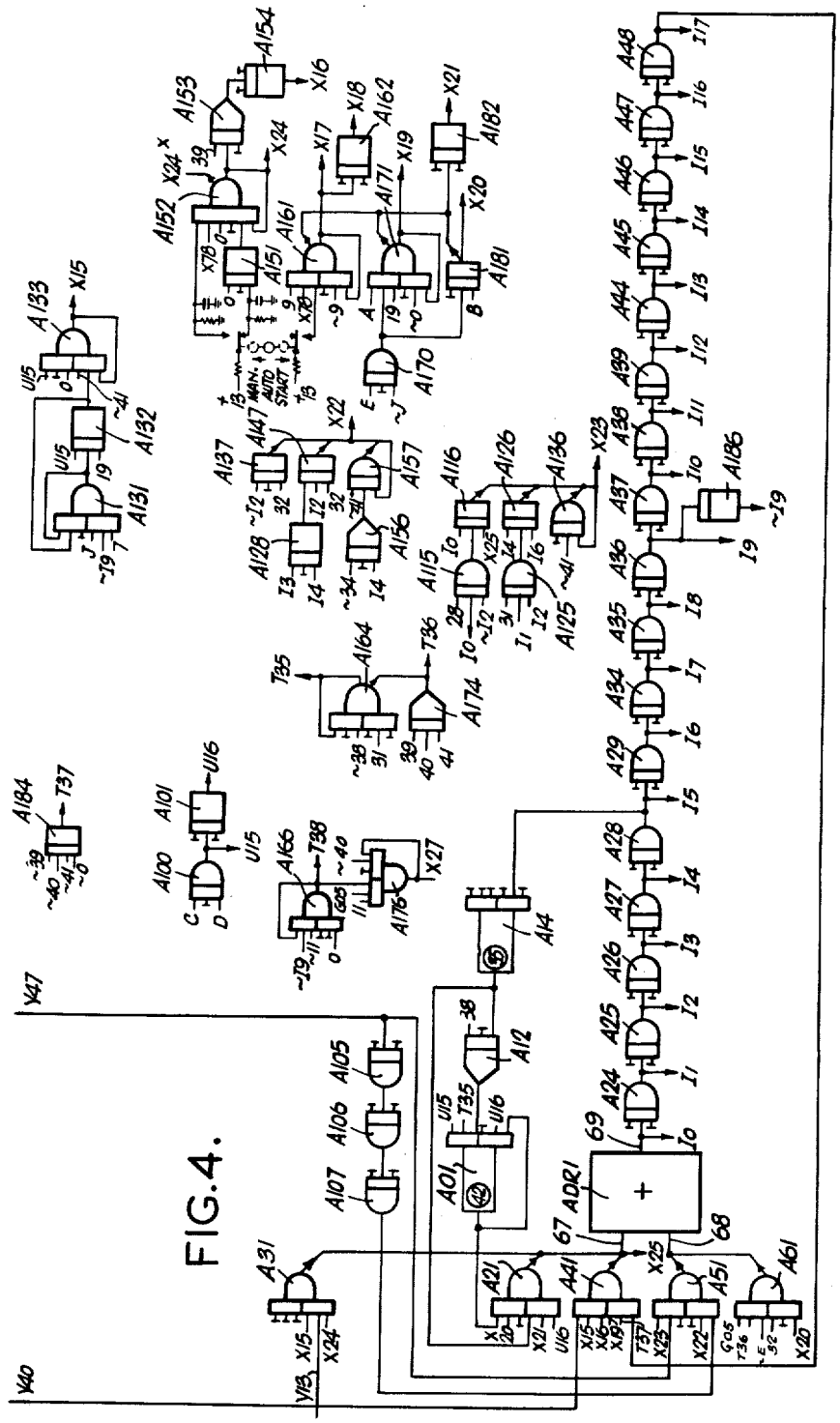
FIG. 4 is a similar more detailed block schematic diagram showing the arrangements of the control line of the control system.

Delay B21 controls the supply of the J10 waveform output from the control line, FIG. 4.

The input bus bar Y41 from the computing store 10 is connected to one entry gate of each of the delays B31, B41, B51 while the opposite entry gates of these same delays are supplied from the further input bus bar Y44 from the computing store.

Output terminal 66 of the computing circuit CPC is connected to one entry gate of a 35 interval delay line B55 in parallel with the output from unit delay B54 which is supplied from the bus bar Y49. The opposite entry gate of the delay line B55 is connected to bus bar Y40. The output from delay line B55 is connected to an output bus bar Y1 leading to the main store 1 and also through unit delay B56 to output bus bar Y2 leading to computing store 10. The output from delay B56 is also fed through further unit delays B57, B58 to unit delay B79. Outputs from unit delays B57, B58 are applied to an inverter B49.

Inverter B49 forms part of the overflow detecting arrangements which also comprise gate B39, double-entry gated delay B38, inverter B47 and gate B130.

Delay B38 is connected as a trigger circuit by back coupling its output to one of its input entry gates and provides the OVR waveform which is "on" when overflow is detected and the trigger circuit set "on."

The aforesaid unit delay B79 forms part of a circulation path which may be required, when required, around the arrangements of the computing unit. This path can have any one of a number of different overall delay times according to requirements. One path route is directly from delay B79 to one entry gate of delay B72. Associated with this path is unit delay B78 operating to copy the form of the digit signal in digit position 39 into digit position 40 of any signal train applied thereto. The length of this path is 41 digit intervals, i.e. one short of the normal 42 digit interval word time and its use will produce a right shift by one place at each circulation.

Another path route is from delay B79 through unit delay B89 and then directly to delay B62. This path is one of 42 digit intervals delay time and signals circulating therearound will remain in unaltered relationship to the machine rhythm.

Yet a further path route is from delay B89 through unit delay B98 to delay B72. The length of this path is 43 digit intervals delay time and its use will produce a left shift by one place at each circulation.

Another version of the output from the computing circuit CPC, equivalent to that at output terminal 66, is also applied to each of double-entry gated delays B26, B36. A double-entry gated delay B16, connected as a trigger circuit, is supplied with the OVR waveform from delay B38 and is interconnected with the parallel connected outputs from delays B26, B36 for application to inverter B17 also controlled by the output from unit delay B06. These elements constitute part of the means for controlling the operation of the trigger circuit comprising the double-entry gated delay B18 which provides the J waveform and, through inverter B09, the ~J waveform.

The precise manner of operation of the circuits of the computing unit varies widely according to the forms of the various control waveforms as determined by the nature of the currently operative order and such operation will be dealt with in greater detail later when the manner of operation during different types of order is described.

ORDER CODE

The various orders capable of being performed by the machine are set out in the attached code list. The particular code number is defined by the F digits of an order, the least significant decimal digit being signalled by the three digits $f0$, $f1$, $f2$ and the most significant decimal digit by the three digits $f3$, $f4$, $f5$.

In the code terminology a capital letter refers to an address of a register while a small letter refers to the number in the register before the order is obeyed and a small letter primed to the number in the register after the order has been obeyed.

N is the address of any register in the computing store; X is the address of any accumulator; $c$ is a counter; P refers specifically to accumulator register number 6 and Q to accumulator register number 7 in multiply and divide operations only while $pq$ and $xq$ refer to double length numbers.

*Order code list*

00 $x'=n$
01 $x'=n+x$
02 $x'=-n$
03 $x'=-n+x$
04 $x'=n-x$
05 $x'=n \ \& \ x$
06 $x'=n\neq x$
07

10 $n'=x$
11 $n'=x+n$
12 $n'=-x$
13 $n'=-x+n$
14 $n'=x-n$
15 $n'=x \ \& \ n$
16 $n'=x\neq n$
17

20 Multiply
$$(pq)'=n.x$$

21 Multiply and round-off in X6,
$$p'=(n.x)_r$$

22 Multiply and add
$$(pq)'=n.x+(pq)$$

23 Justify $(nq)$.
24 Divide, unrounded
$$q'=(xq)/n. \quad p'=\text{remainder}$$

25 Divide rounded
$$q'=((xq)/n)_r. \quad p'=\text{remainder}$$

26
27
30
31
32
33
34
35
36
37
40 $x'=c$
41 $x'=c+x$
42 $x'=-c$
43 $x'=-c+x$
44 $x'=c-x$
45 $x'=c \ \& \ x$
46 $x'=c\neq x$
47

50 Single-length shift up.
51 Single-length shift down (rounded).
52 Double-length shift up.
53 Double-length shift down.
54 Normalize $(pq)'=2^n(pq)$. $x'=x-\mu$.

55
56
57

60 Jump if $x=0$.
61 Jump if $x \neq 0$.
62 Jump if $x>0$.
63 Jump if $x<0$.
64 Jump if overflow indicator clear.
65 Jump if overflow indicator set.
66 Unit-modify.
67 Unit-count.

70 Single-word read from main store.
71 Single-word write to main store.
72 Block read from main store.
73 Block write to main store.
74 External switching for input/output.
75 Stop.
76
77

CONTROL SYSTEM

Beat counter

Figure 3:
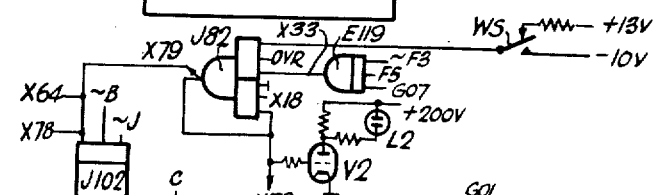
FIG. 3 is a more detailed block schematic diagram illustrating the arrangements of the beat counter used for controlling the machine rhythm.

The arrangements of the beat counter portion of the control system, which serve to determine the appropriate beat-by-beat periods of the machine rhythm, are shown in FIG. 3. As these arrangements have been described in detail in the aforesaid copending application B, they will only be briefly referred to. They comprise a group of five double-entry gated delays J130, J132, J133, J134 and J135 each of which is arranged as a trigger circuit.

The delay J130 provides the A waveform defining, by its "on" periods, the A periods of the machine rhythm while the output from the delay J132 similarly provides the B waveform defining the B periods of the machine rhythm. An inverse version of this B waveform, $\sim$B waveform, is derived from inverter J112. The outputs from the two A and B delays J130 and J132 are combined to form the inverse version, $\sim$C, of the C waveform which itself is provided by the output from the inverter J141.

The output from the delay J133 forms the D waveform defining, by its "on" periods, the D beat periods of the machine rhythm while an inverter J152 provides the inverse version, the $\sim$D waveform. The output from the delay J134 provides the E waveform similarly defining the E beat periods of the machine rhythm while the inverter J154 provides the inverse version of this waveform, the $\sim$E waveform. The final delay J135 provides the $u$10 waveform which is used as one controlling input to the gate J103.

It will thus be seen that there are provided waveforms A, B and C which define the A, B and C periods and also beat waveforms D and E defining the first and last beats of either the A or the B periods although the D and E beats may not be consecutive. It will be noted also that in actual timing the various period and beat defining waveforms commence at the beginning of 41 digit pulse time and terminate at the end of 40 digit pulse time.

Control instruction line

The arrangements of the control instruction line of the control system are shown in FIG. 4 and comprise a serially connected chain of unit delays A24, A25 ... A48. The input to the first unit delay A24 is derived from a logical adding circuit ADR1 which can be of any well known form serving to provide on lead 69 an output representative of the addition of two separate input pulse trains simultaneously present on leads 67 and 68. The first input to the adder ADR1 on lead 67 is derived through one or other of the double-entry gated delays A21, A31 or A41 while the second input to the adder on lead 68 is derived through one or other of the two double-entry gated delays A51, A61. The output from the last unit delay A48 of the chain is fed back to the delay A41 while a tapping at the output of unit delay A28 is applied to one input of a 35-interval delay line A14. The output from the latter is fed direct to one input gate of the delay A21 and is also applied through mixer A12 to one input of a further 42-interval delay line A01. The output from the latter is applied to the opposite input gate of the delay A21 and is also fed back to its own alternative input gate to form a word storage loop. This loop serves to hold a number representing the address in the computing store 10 of the last selected order word.

One external input to the control instruction line is over the bus bar Y40 to the delay A41 supplying the first input lead 67 of the adder ADR1 while a second external input is over bus bar Y13 from the hand switches, FIG. 9, to be described later, to delay A31. A third external signal input is from the bus bar Y47 either directly to one input gate of the delay A51 or by way of three serially arranged unit delays A105, A106, A107 to the opposite input gate of the same delay A51.

The control waveform X20 used at delays A21 and A61 is derived from the gate A181 and is normally "on" during the E beat of each B period while control waveform X21 used at delay A21 is derived from the inverter A182. The control waveform X15 is derived from the double-entry gated delay A133, the control waveform X16 from the inverter A154, the control waveform X19 from the double-entry gated delay A171 and the timing waveform T37 from the gate A184. The control waveform X23 for double-entry gated delay A51 is derived from the gates A116, A126 and unit delay A136 while the control waveform X22 is derived from the gates A137, A147 and unit delay A157. The U15 waveform controlling one input of the delay line A01 is derived from the unit delay A100 and the timing waveform T35 from the double-entry gated delay A164 while the U16 waveform controlling the opposite entry of this delay line is derived from the inverter A101.

A plurality of separate instruction line output waveforms I0, I1, I2 ... I17 are derived respectively from the output lead 69 of the adding circuit ADR1 and the outputs of the successive unit delays A24, A25 ... A48. Each of these instruction line outputs is of similar form but of progressively delayed timing each being one digit interval later than its predecessor. Thus the output from the adder ADR1 is, as will be seen later, 3 digit intervals late on standard time; therefore the instruction line output I1 is 4 digit intervals late on standard time, the instruction line output I2 5 digit intervals late on standard time and so on, the instruction line output I17 being 20 digit intervals later on standard time. The instruction line output I9 is also made available in inverse form as the $\sim$I9 waveform through inverter A186.

N-digit staticisors

Figure 5:
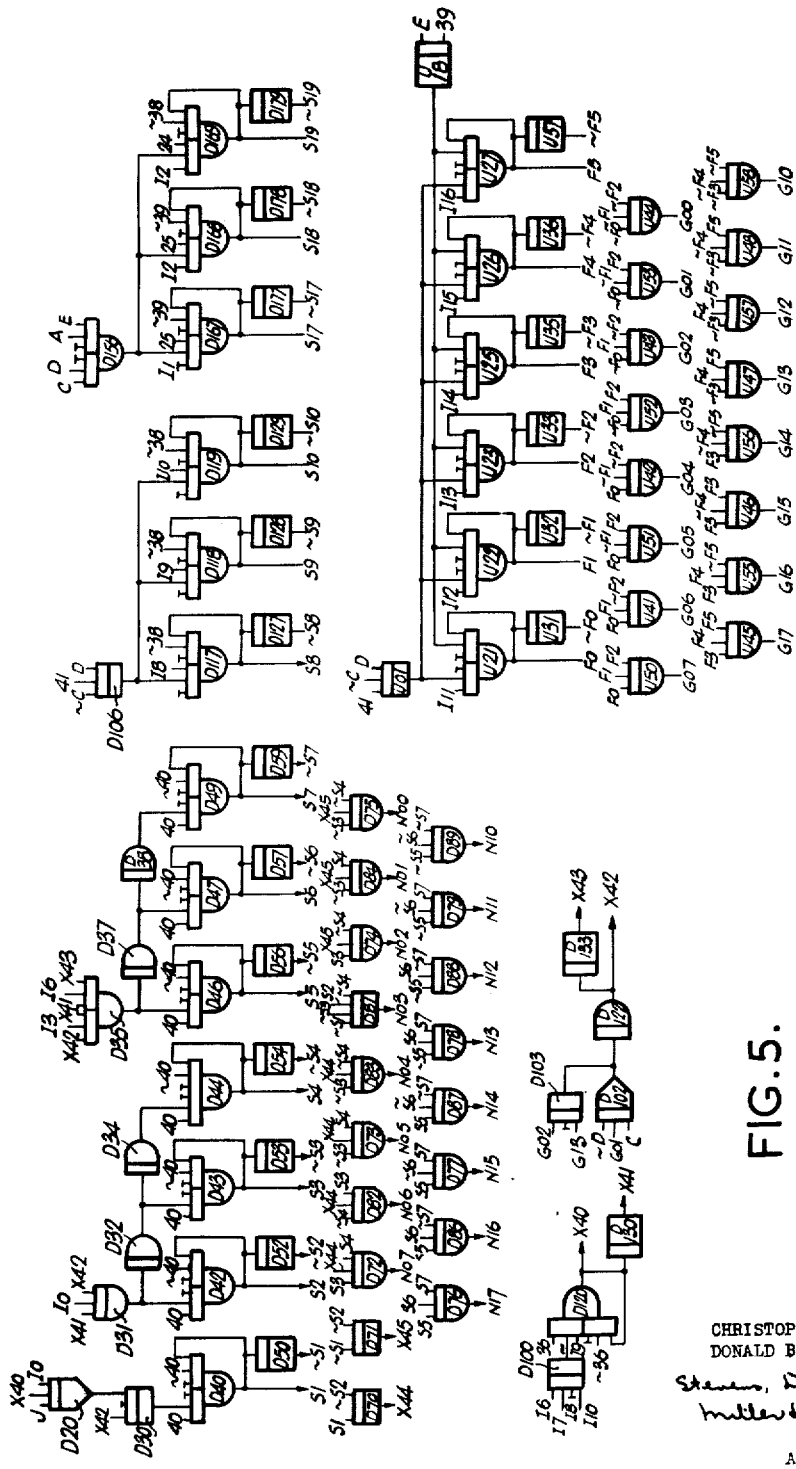
FIG. 5 is a similar more detailed block schematic diagram of the various staticisor and associated decoding arrangements for dealing with the different groups of digits of an order.

The staticisors for dealing with the N digits of an order are shown in FIG. 5. As these devices and their manner of operation are described in detail in the aforesaid copending application B, they will be only briefly referred to. They comprise a group of seven double-entry gated delays D40, D42, D43, D44, D46, D47 and D48 each arranged as a trigger circuit. The direct output from each of these double-entry gated delays provides respectively the S1, S2 ... S7 waveforms while an inverse version of each waveform is made available through the associated inverters D50, D52 ... D59.

The signal input to the first delay D40, which deals with the most significant of the N digits, $n$6, of an order, is derived from gate D30 fed with the I0 output from the control instruction line. As the entry gate of the delay D40 is also supplied with the 40 digit time pulse waveform it tests the incoming signal during digit interval 40 and sets the trigger circuit "on" if the tested digit ($n$6) is of value "1" and leaves it reset "off" if of value "0."

The signal input gate of the next delay D42 is derived from unit delay D31 which is also fed with the I0 waveform and serves to test the next N digit, n5, of an order. The output from this unit delay D31 is also applied through further unit delay D32 to the signal input gate of the delay D43 and through a further unit delay D34 to the similar signal input gate of the next delay D44 for operation in similar manner to test digits n4 and n3 respectively.

The delay D46, which deals normally with the N digit, n2, derives its signal input from a double-entry gated delay D35 one input gate of which is supplied with the I3 output from the control instruction line and the other input gate of which is supplied with the I6 output from the control instruction line. The output of this delay D35 is also applied through a further unit delay D37 to the signal input gate of the delay D47 which deals with the N digit, n1, and by way of a further unit delay D38 to the similar signal input gate of the last delay D49 which deals with the least significant of the N digits, n0.

The various staticised outputs, which are dependent upon the configuration of the N digits of an order, are combined in partial decoding circuits consisting of gates D70, D71 and D81 and unit delays D72, D82, D73, D83, D74, D84, D75, D76, D86, D77, D87, D78, D88, D79 and D89.

Various combinations are made of the trigger circuit outputs dealing with the most significant 4 digits of the N address digits to form the waveforms N00, N01 . . . N07 while a similar decoding of the outputs from the trigger circuits dealing with the 3 least significant N digits provides the N10, N11 . . . N17 outputs. It will be noted that these staticised outputs persist for one beat time only. It will also be observed that, when each of the N-digit trigger circuits is in its quiescent or "off" state, the N00 and N10 waveforms are "on." These waveforms (which define the address number 0 which is physically non-existent) are therefore normally present at all times when the N-digit staticisors are not otherwise set.

*X-digit staticisors*

The staticisor arrangements for dealing with the X-digits of an order are also shown in FIG. 5 and have been described in detail in the aforesaid copending application B. Briefly they comprise the three double-entry gated delays D117, D118 and D119, arranged in similar manner to those of the N digit staticisors. The signal entry gate of delay D117 is fed with the I8 wave form output from the control instruction line, the next delay D118 with the I9 waveform output from such line and the third delay D119 with the I10 waveform output from such line.

In the operation of these X staticisor arrangements, each trigger circuit is set "on" or "off" in accordance with the configuration of the related X digit at digit pulse time 41 of each D beat except those occurring in the C period and they all become reset "off" again at the next following digit interval 38. The resultant S8, ~S8, S9, ~S9, S10 and ~S10 waveforms which control the connection of one of the accumulator registers 0–7, FIG. 6, to the bus bar Y44, FIG. 6, accordingly become effective from digit interval 0 to digit interval 38 of each D beat in periods A and B.

*M-digit staticisors*

The staticisor arrangements for dealing with the M digits of an order are also shown in FIG. 5 and have been described in the aforesaid copending application B. Briefly they comprise the three double-entry gated delays D167, D168 and D169 arranged as trigger circuits and serving to provide respectively the S17, S18 and S19 waveforms and their inverse versions ~S17, ~S18, ~S19 used for controlling the connection of one of the accumulator registers numbered 0–7, FIG. 6, to the bus bar Y47.

In the operation of these M-digit staticisor arrangements, the three trigger circuits are conditioned for setting during either the D beat of period C or the E beat of period A by the output from the delay D156. According to the form of the signal arriving from the control instruction line at the 24 or 25 digit intervals of the particular beat concerned so each trigger circuit will be set accordingly and reset to zero again at the next following 38 or 39 digit interval.

*F-digit staticisors*

The staticisor arrangements for dealing with the F digits of an order are also shown in FIG. 5 and have been described in the aforesaid copending application B. Briefly they comprise the 6 double-entry gated delays U21, U22 . . . U27 arranged as trigger circuits and serving to provide respectively the F0, F1, F2 . . . F5 outputs and their inverse versions ~F0, ~F1 . . . ~F5. The various outputs from these F-digit trigger circuits, of which the output F0 is determined by the nature of the most significant F digit f5 and the output F5 by the nature of the least significant F digit f0 of any order, are partially decoded in two groups of three, the group F0, F1, F2 and their inverse versions being dealt with by the eight unit delays U50, U41, U51, U42, U52, U43, U53 and U44 to provide the G07 . . . G00 outputs and the remaining least significant group of outputs F3, F4 and F5 and their inverse versions being dealt with by the unit delays U45, U55, U46, U56, U47, U57, U48 and U58 to provide the G17, G16 . . . G10 outputs.

It will be noted that the function digit configuration once set up in the D beat remains set up until the end of the next following E beat which may be the succeeding beat or several beats later dependent upon the type of function being performed.

*T waveform generators*

The arrangements provided for generating certain of the various T or timing waveforms are shown in FIG. 9 and comprise a serially connected chain of unit delays T11, T12, T13 . . . T16, T21 . . . T27, T31 . . . T36. The input to unit delay T11 is provided from a double-entry gated delay T10 to each signal entry gate of which is supplied the output from an inverter T05, one gate being under the control of the T21 waveform, referred to later, and the opposite gate being connected to bus bar Y20 over which the address track signals derived from the magnetic drum store are applied. The input to inverter T05 is derived from mixer circuit T06 one input of which is supplied with the parallel connected outputs from each of the unit delays T11 . . . T16, another input of which is supplied with the parallel connected outputs from each of the unit delays T21 . . . T27 and a third input of which is supplied with the parallel connected outputs of the unit delays T31 . . . T36. The output from the inverter T05 provides the T1 waveform, that from the double-entry unit delay T10, the T2 waveform, that from the unit delay T11, the T3 waveform and so on through the chain of delays, the delay T32 providing the T17 waveform, the delay T33 the T18 waveform, the delay T34 the T19 waveform, the delay T35 the T20 waveform and the final delay T36 the T0 waveform.

A double-entry gated delay T29 is arranged as a trigger circuit by back coupling its output to one of its signal entry gates which is controlled by the output from an inverter T19 supplied with the T17 waveform referred to above and also with the output of the trigger circuit of delay T29. The opposite entry gate of the delay T29 is also supplied with the T17 waveform and with the output from inverter T19. Delay T29 provides the T21 waveform and an inverse version of this, the T22 waveform, is supplied from inverter T38 whose input is connected to the T21 waveform output.

The operation of the arrangement is as follows. The address track output signal always contains a 1-representing pulse in digit time 1 of each beat period and this pulse, on arrival over bus bar Y20 passes through delay T10, now opened by "on" output from inverter T05, and provides an output pulse in digit time 2. This output pulse passes through the further unit delay T11 to provide a similar output pulse in digit time 3 forming the T3 waveform and in addition is passed directly through mixer T06 to the inverter T05 where it inhibits the output which would otherwise be provided. This closes the input gate of delay T10 against any further address track signals and causes the T1 waveform to go "off." The output from delay T11 operates in a similar manner as do the succeeding outputs from delays T12, T13 and so on so that the signal pulse released at digit time 2 passes down the line of delays to provide a series of separate output pulses at each of the succeeding digit intervals, the T20 waveform containing an output pulse in digit time 20 and the T0 waveform an output pulse in digit time 21.

Referring now to the generators of the T21 and T22 waveforms, the trigger circuit will be first assumed to be in its "off" state so that there is no input to the second input lead of the inverter T19 at the time of the T17 waveform pulse in digit time 17. In consequence the normally present output from the inverter is not inhibited and the simultaneously occurring pulse of the T17 waveform applied to the opposite input gate of the delay T29 serves to set the trigger circuit "on." The T21 waveform accordingly goes to its "on" state at digit interval time 18 of each beat period and the T22 waveform goes "off" at the same instant. This state of affairs will persist until the next output pulse arrives on the T17 output. This occurs, as will be clear later, in digit time 38. As the trigger circuit around delay T29 is now "on" there will be a second input to the inverter T19 and the aforesaid pulse in 38 digit time in the T17 waveform will cause the inverter output to be inhibited thereby inhibiting the regeneration cycle of the trigger circuit whereby the trigger circuit output which forms the T21 waveform goes "off" at the end of the 38 digit interval. The inhibition of the output from the inverter T19 simultaneously blocks the same pulse in 38 digit time of the T17 waveform from causing the trigger circuit to be reset "on" again. The T21 waveform is thus in its "on" state from the beginning of digit time 18 until the end of digit time 38 and the T22 waveform is "on" from the beginning of digit time 39 until the end of the following digit time 17.

Reverting now to the chain of unit delays T11 . . . T36, the T0 waveform contains a pulse in digit time 21 as already explained. After this pulse has decayed, i.e. in the next following digit time 22, there will be no input on any of the input leads to mixer T06 and in consequence inverter T05 will then provide an output in digit time 22. This forms the T1 waveform. This output pulse is applied to the second input gate of the delay T10 which is now opened by the T21 waveform and this pulse commences to pass down the line of serially connected delays to provide a second series of output pulses in each of the T2, T3 . . . T20, T0 waveforms in digit times 22, 23, 24 . . . 39, 40, 41 and 0 time of the next beat. The decaying of the T0 digit pulse in 0 digit time of the next beat will result in there again being no input to the mixer T06 which accordingly allows the inverter T05 to provide an output on the T1 waveform in digit time 1 and this coincides with the pulse in 1 digit time of the next address signal arriving from the magnetic drum store whereupon the cycle described above is repeated.

The outputs provided on each of the waveforms T0, T1 . . . T20 comprise two pulses in each beat period, the T0 waveform having a pulse in digit times 0 and 21, the T1 waveform a pulse in digit times 1 and 22, the T2 waveform a pulse in digit times 2 and 23 and so on, the T17 waveform having a pulse in digit times 17 and 38, the T18 waveform a pulse in digit times 18 and 39, the T19 waveform a pulse in digit times 19 and 40 and the T20 waveform a pulse in digit times 20 and 41.

These T waveforms are used at various places throughout the machine but are particularly employed in connection with the generation of input signals by means of the hand switches which are also illustrated in FIG. 9 and described below.

*Hand switches*

The hand switch arrangements for generating a number word signal are shown in FIG. 9 and comprise a series of gates W10 . . . W31. Each of these gates has one input connected to a hand switch Sn9 . . . Sn0, Sx2 . . . Sx0, Sf5 . . . Sf0, Sm2 . . . Sm0 the opposite side of each switch being connected through a resistor to the source of positive potential +13 v. The other active signal input to each gate is connected to a different one of the T waveforms T0, T1 . . . T20 as shown. The outputs from each of the gates W11–W13 are connected in parallel and fed to one input gate of a double-entry gated delay W32 and also to a unit delay W42. The output from delay W10 is fed to the opposite input gate of delay W32 and to a further unit delay W52. The output from delay W32 is applied through two further unit delays W33 and W34 to one entry gate of a further double-entry gated delay W37 whose output is applied over bus bar Y13 to the delay A31 of the control line shown in FIG. 4. The outputs from delays W42 and W52 are connected in parallel and applied to the opposite entry gate of the delay W37.

The two opposing entry gates of delay W37 are controlled whereby one only can be operative at any one time through the intermediary of a manual control switch MS which, as shown, provides a positive control potential to one entry gate and a negative blocking potential to the other entry gate, the operative gate being determined by the setting of the switch. When in the position shown signals from delays W42 and W52 are allowed to pass to the Y13 bus bar. As will be shown later, the timing of these signals corresponds to those of an A order. When the switch MS is in the position opposite to that shown, signals from delay W34 are allowed to pass to the Y13 bus bar. The timing of these signals corresponds to a B order. A further gate W36 supplied with the ~21, ~20 and ~19 digit pulse waveforms supplies its output as a further controlling input of the entry gate of delay W37 which is operative when signals from delay W34 are being fed to bus bar Y13.

The operation of these hand switches is as follows.

The significance of each of the various hand switches, relative to the different digits of an order, is that shown by its identification reference, the switch Sm0 corresponding to the m0 digit of an order, the switch Sm1 to the m1 digit and so on, the further switches Sn7, Sn8 and Sn9 relating to digit signals which may be required to extend the length of the N digit part of an order in a manner analogous to those shown in FIGS. 2f, 2g and 2h. Thus, if switch Sm0 is closed and switch MS is in the position shown, the T18 waveform (which contains a pulse in digit times 18 and 39) is fed to delays W32 and W42. The digit pulse in time 18, however, cannot pass through the entry gate of delay W32 as the controlling T22 waveform is "off." Such pulse will pass delay W42 and thence to the lower entry gate of delay W37 where it will emerge on bus bar Y13 in digit time 20. As the input signals to the control line of FIG. 4 are always 1 digit interval late, relative to standard machine time, such pulse corresponds to an m0 digit value "1" of an A order. The succeeding pulse in 39 digit time of the T18 waveform will not pass through the delay W42 as the T21 waveform has by this time gone "off" but it will pass through the upper entry gate of delay W32 and thence through delays W33, W34 to the upper entry gate of delay W37. As this gate is closed, the released digit signal will not pass to the bus bar Y13. If, on the other hand, switch MS is in the opposite position to that shown, calling for the provision of a B order, the pulse in 18 digit time of the T18 waveform, although passed to the lower entry gate of delay W37, will be blocked from proceeding further. The subsequent pulse, in 39 digit time, after proceeding through delays W32, W33 and W34, will be allowed to pass the upper entry gate of delay W37 and will emerge on bus bar Y13 4 digit intervals later, i.e. in digit time 1 of the next beat. This corresponds with the $m0$ digit of a B order signal arriving (1 interval late) at the control line input.

The inhibiting signals in digit times 19, 20 and 21 supplied from gate W36 serve to close the upper entry gate of delay W37 and thus to prevent the attempted insertion, as a B order, of signals from the extension digit switches $Sn7$, $Sn8$ or $Sn9$. These are not permissible in a B order since they overlap, in timing, with the M digits of the associated A order of the order word.

OPERATION

Before dealing in detail with the manner of operation of those elements of the machine which are particularly concerned with the present invention, it is desirable briefly to describe the normal simple manner of operation. Such simple operation, including the manner of effecting modification of an order, is described in greater detail in the aforesaid copending application B to which reference should be made when necessary.

A control address number signal is continuously circulating around the storage loop including delay line A01, FIG. 4. This number is fed, during the E beat of the B period of the time during which the immediately preceding order word is being obeyed, through delay A21 to one input of the adding circuit ADR1 of the control line arrangements, FIG. 4. At the same time a 32 time pulse is applied through delay A61 to the second input of the adding circuit ADR1 whereby the aforesaid control address number signal is increased in value by unity.

The new control address number signal emerging from the adding circuit ADR1 flows down the control line of delays A24 . . . A48 and also passes back through delay line A14 and mixer A12 into the storage loop which includes the delay line A01 where it is retained until the next following E beat of a B period.

The control number signal, in flowing down the control line of delays A24 . . . A48, provides the plurality of control line output waveforms I0 . . . I17 and certain of these are caused to be operative upon the N-digit staticisors, FIG. 5, at the 40 digit pulse time of the same E beat of the B period. The N-digit staticisors are thus set to select the particular storage address specified by the control address number signal at the end of the said E beat. This selected register is the one containing the next required order word and is always one within the four groups 4, FIG. 1, having address numbers 64–95.

The beat counter, FIG. 3, is now stepped on by the X80 waveform to commence the D beat of the C period. During this beat the signal from the selected computing store register flows over bus bar Y40 through delay A41 to enter the control line through the adding circuit ADR1. During the passage of this order word signal down the control line, the M digits of the A order portion are tested to set the M-digit staticisors, FIG. 5. These M digits define the address, within one of the group of accumulator registers 2 of the computing store, of any required modifier word which may be needed to modify the N or the N and X digits of the order about to be used. These modifier digits are located near the most significant end of the word (see FIG. 2d) so that, after setting of the M-digit staticisors, the necessary modifier digits or a portion of such digits in the signal stored in the selected register can be fed out over bus bar Y47 to delay A51 whereby such modifier digits arrive at the adding circuit ADR1 in a required timing relationship with the N or the N and X digits of the A order portion of the order word signal still flowing in over the bus bar Y40. The A order is accordingly modified in accordance with the nature of the modifier digits and the modified order signal flows down the control line. The order word signal as a whole, i.e. containing both A and B orders, is fed back through delay line A14 to input delay A21 whereby it continues to circulate once in each beat time around the arrangements of the control line.

At the first presentation, just described, the order word signal also flows through the length of the line, the least significant half containing the B order being lost. At the appropriate instant at the end of the D beat of the C period the N-digit staticisors are reset to zero and the various control line waveform outputs I0 . . . I17 employed to set such N-digit staticisors again and also to set the X- and F-digit staticisors.

The beat counter then changes again to define the first or D beat of the next or A period. Simultaneously the setting of the X-digit staticisors has defined a required one of the accumulator registers of the block 2 and the setting of the N-digit staticisors a required register anywhere within the computing store 10 as the respective sources of two operand-representing signals. During the D beat of this A period these two operand-representing signals flow out of the computing store 10 over bus bars Y41 and Y44 to the computing unit 5 where they are dealt with in accordance with the nature of the particular function which has been specified by the F digits of the order and controlled by the setting of the F-digit staticisors.

The beat counter then changes again to define the last or E beat of the A period. The N- and X-digit staticisors are at this instant reset to zero but the F staticisors remain set. The N-digit staticisors are again set either by the N digits or by the X digits of the order, according to the nature of the order specified by the F digits, by using the appropriate outputs I0 . . . I17 from the control line which become available again due to the recirculation of the order word therethrough.

The answer signal now becoming available on the output bus bar Y2 from the computing unit 5 proceeds to the input of the computing store 10 and flows to the particular register which is now defined by the new setting of the N-digit staticisors.

This marks the end of the A period during which the A order is obeyed and during this last E beat, a return path is provided for the leading or B order part of the circulating order word signal from the end of the control line at delay A48 back through the input delay A41 while the second or A order part of the circulating order word signal is blocked from re-entry into the line at delay A21. Due to the shortened return path length the B order is transferred in timing to the position of an A order and the various control line outputs I0 . . . I17 become available as before but with forms which are determined by the respective digits of the B order.

The cycle of operations referred to above in connection with an A order is now repeated but, of course, with the B order configuration of the various digits. The D and E beats of the B period follow exactly as in the case of the A period and at the end of the E beat of the B period the operation of selecting the next order word is commenced as already described.

DETAILED OPERATION—OVERFLOW

The operation of the arrangements for detecting overflow and of the control means which are governed by such overflow detecting arrangements will now be described.

As already mentioned in connection with the arrangements of the computing store 10 illustrated in FIGS. 6a–6d, the bus bars Y41 and Y44 by which the respective operand signals are fed to the computing unit 5, are each provided with means for copying the form of the sign digit (digit position 38, FIG. 2a) into the next following digit position (digit position 39, FIG. 2a) during their out-flow from the computing store. These means consist of the double-entry gated delay V54 for bus bar Y41 and double-entry gated delay V57 for bus bar Y44. In each case, the 40 digit time pulse waveform allows completion of the regenerative loop around the delay whereby the digit signal emerging from the delay at 40 digit time is returned to the input of the delay and is so repeated at 41 digit time. The opposite entry gate, which is fed from the computing store, is closed during the same time interval as a safety measure by the ∼41 digit time pulse waveform. As the output signals from the selected registers have each been delayed en route by two digit intervals, the digit signal which is thus treated is that of the required 38 or sign digit.

It can be demonstrated that, if, after the performance of the required operation within the computing unit 5 or elsewhere, the sign digit (38) and the copied sign digit (39) of the answer signal differ in their respective values, then overflow has occurred. Thus, if addition is effected of two positive numbers, whose respective sign digits are accordingly each of value "0" and whose succeeding digits are, for example 1100 . . . and 10000 . . . respectively, a carry digit will be propagated by the addition of the two (37) digits (each of value $2^{-1}$) in the respective numbers and this carry digit, upon its addition to the next more significant digit, i.e. the sign digit, will cause such sign digit value to become "1" which erroneously indicates negative sign. The addition of the two copied sign digits (39) will, however, still produce an answer digit value "0". The resultant difference of value between the sign digit (38) of the answer and the next or copied digit (39) of the answer indicates overflow. Similarly with other forms of combination of number signals.

Referring now to FIG. 7, the overflow detecting arrangements of the computing unit 5 comprising a staticisor device including delay B38, arranged as a trigger circuit by back coupling its output to that one of its input entry gates which is controlled by the Y68 and X8 waveforms. This delay has its opposite entry gate supplied with the 39 digit time pulse waveform, with the output from gate B39 and with the output from inverter B47.

The output from inverter B47 can be regarded as normally "on" since the applied G05 and X4 waveforms define orders 52 or 53 which are shift orders. Gate B39 is controlled by the output from inverter B49 and by the parallel connected outputs from delays B57 and B58 of the signal transmission path through the computing unit. Inverter B49 has two controlling inputs derived respectively from the said delays B57 and B58. Delay B58 is controlled by the output from inverter B47 which, as already stated, is normally "on" and is also supplied with the inverse 39 digit time pulse waveform. Delay B58 can therefore normally be regarded as continuously operative.

The signal output from delay B57 is in synchronism with standard machine time and at the 39 digit pulse time, will be providing the digit signal in the 39 or copied sign digit position. The sign digit signal itself will be that emerging from the delay B58.

If the respective sign and copied digits are of value "0", there will be no direct input from the parallel connected outputs of these delays to the gate B39 and correspondingly no input to the entry gate of the delay B38 at the 39 digit pulse time. The overflow staticisor of delay B38 accordingly is not set "on". If the two 38 and 39 digit signals are each of value "1", although there will now be an input from the parallel connected outputs of the two delays B57 and B58 to the gate B39, the similar application of "1" value signals to each input of the inverter B49 will inhibit its normally present "on" output and gate B39 will remain closed. Again there is no input to the entry gate of the delay B38 controlled by the 39 digit pulse and the overflow staticisor is again not set "on". If, on the other hand, one of the outputs from delays B57 and B58 is of value "1" and the other is of value "0", the parallel connection of such delay outputs to gate B39 will provide an input to gate B39 while the inverter B49 will not be inhibited. Gate B39 accordingly passes a signal for coincidence with the 39 digit time pulse waveform at the entry gate of delay B38 and as the output from inverter B47 is "on" the trigger circuit around delay B38 is set "on" to provide the "on" state of the overflow indicating waveform OVR.

The maintenance of the trigger circuit in its now set "on" condition is governed by the Y68 and X8 waveforms. The X8 waveform is derived from inverter B170 which is supplied with the F3 and ∼F4 waveforms and also with the X7 waveform output from gate B160 which is itself supplied with the G06, E and 2 digit pulse waveforms. As a result, the X8 waveform is "on" continuously until 2 digit time of an E beat of the period when an order number 64 or 65 is operative. When either of such orders becomes effective, the overflow staticisor is reset "off" in readiness for use at the end of the same beat. The Y68 waveform is derived from the inverter M79 forming part of the control arrangements for the registers ACR6 and ACR7 and shown in FIG. 8. This inverter is controlled by the 40 digit time pulse waveform and the output from a unit delay M78 which is itself controlled by the G02, G13 and D waveforms. In consequence the output from inverter M79 is continuously "on" until the 40 digit time of the D beat of an order period in which order number 23 is being obeyed. When this order is signalled, the overflow staticisor is reset "off" at the 40 digit time of the D beat in readiness for use during the subsequent E beat.

Order number 64 mentioned above is one calling for a jump operation if the overflow indicator is clear, order number 65 is one calling for a jump operation if the overflow indicator is set and order number 23 is the "justify" order. The manner of operation of each of these orders will be dealt with in detail later.

The above arrangements deal with the possible occurence of overflow during a computing operation within the computing unit 5. A further location where overflow may occur is in the "q" register ACR7 which, in combination with the "p" register ACR6 and the computing unit, is employed during multiplication and division operations. If overflow occurs in the number signal circulating in the register ACR7 during a division operation, this is indicative of a major error and is signalled by the fact that the sign digit (38) and the copied sign or guard digit (39) of the number signal circulating around the register ACR7 have the same value.

The arrangements for detecting overflow in the said register ACR7 are shown somewhat similar to those of the computing unit already described and comprise the double-entry gated delay M86, FIG. 8, arranged as a trigger circuit by back coupling its output to one entry gate controlled by the X18 waveform (which is normally "on") and the output Z1 from a control switch ZS which is normally closed to porvide a positive-going or "on" input. The opposite entry gate of delay M86 is supplied with the Q1 waveform and the output from gate M75 which is supplied with the parallel connected outputs of gate M66 and inverter M65 and is further controlled by the E and 37 digit time pulse waveforms. Inverter M65 has a single active input supplied with the combined signals from the Y62 and Y64 bus bars leading respectively from unit delays Q66 and Q65 in the signal circulation path of the "q" register ACR7, FIG. 6d. The gate M66 is controlled on two active inputs by the signals on the Y61 and Y63 bus bars leading respectively from the same delays Q66 and Q65.

The Q1 waveform applied to delay M86 is derived from unit delay N80, FIG. 8, and is "on" only for division orders numbered 24 or 25. The respective outputs available from delays Q66 and Q65 at the digit interval time 37, defined by the 37 digit pulse waveform on gate M76 are those of the sign digit (38) and the copied sign or guard digit (39). If both of these digits are of value "0," gate M66 will not provide an output but the inverter M65 will provide an "on" output at digit time 37 and this will pass gate M76 to set the trigger circuit around delay M86 and, consequently the X64 waveform, to the "on" state. Similarly, if both of the said digits are of value "1," although inverter M65 will not now provide an "on" output, the gate M66 will operate to provide the necessary triggering input for the circuit of delay M86. On the other hand, if only one of the digits is of value "1" and the other of value "0," gate M66 will not operate to provide an "on" output while the inverter M65 will have its normal "on" output inhibited. There is, accordingly, no triggering input to the circuit of delay M86 and the X64 waveform remains "off." In every case, the input to the delay M86 is controlled by the Q1 waveform which is "on" only when a division operation is in progress.

The detection of the event of overflow is arranged to produce different effects upon the machine according to the nature of the operation in which overflow has occurred.

In the case of overflow during division, signalled by the setting "on" of the trigger circuit around delay M86, the resultant "on" level of the X64 waveform output is applied as one of the controlling inputs to the inverter J102 associated with the beat counter circuits, FIG. 3. As explained in the aforesaid copending application B, inverter J102 normally provides a continuous gate opening potential to gate J103 in order to allow the regular production of the necessary stepping pulses of the X80 waveform to define the successive A, B and C periods. The ~J and ~B inputs to inverter J102 are normally both "on" but those of the applied further control waveforms X79, X78 and X64 are normally "off." When the X64 waveform goes "on," as explained above, the output from the inverter J102 is inhibited and it is thereafter not possible for the machine to proceed beyond the C period next in order. The computing cycle of the machine is thus brought to a stop. The occurrence of this stop action is indicated by lighting a suitable neon indicator lamp L1, FIG. 8, by application of the X64 waveform to the control grid of valve V1.

The detection of overflow in the computing unit 5 at any time, signalled by the setting "on" of the trigger circuit around delay B38 to cause the OVR waveform to go "on," provides an output signal to one entry gate of the double-entry gated delay J82, FIG. 3. This delay is arranged as a trigger circuit by back coupling its output to its opposite signal entry gate which is controlled by the X18 waveform (normally "on" as already stated). The entry gate supplied with the OVR waveform is controlled also by the X33 waveform and by the setting of a hand switch WS which is normally in the position shown to provide a positive potential to the gate. The X33 waveform is derived from unit delay E119 which is controlled by the F5, ~F3 and G07 waveforms which are active only when the order number is 71 or 73 (both of which are write orders for transferring information from the computing store 10 to the main store 1). The setting "on" of the OVR waveform by the occurrence of overflow within the computing unit may, therefore, not be immediately effective upon the operation of the machine. If, however, after the overflow staticisor has been thus set "on," the programme should contain a write order 71 or 73, immediately such write order becomes effective in the control line, FIG. 4, the trigger circuit around delay J82 will be set "on." This will provide an "on" level in the X79 waveform applied to the inverter J102 of the beat counter. The machine is therefore again brought to a halt and the action of writing from the computing store 10 into the main store 1 is prevented. Simultaneously, an indicator lamp L2 is illuminated through valve V2 to give a visual warning indication.

In some circumstances the presence of overflow is legitimate and the writing in of the answer signal into the main store 1 is in order. To allow writing in operation to take place even although overflow may be detected, the switch WS is reversed from the position shown whereby the trigger circuit around delay J82 is prevented from being set "on" by the occurrence of overflow.

The detection of overflow within the computing unit may also be treated arithmetically by use of the jump orders 64 or 65 described below.

OPERATION WITH JUMP ORDERS (60–65)

The J or jump waveform generated in the trigger circuit around delay B18, FIG. 7, is normally "off" and the ~J waveform normally "on." This trigger circuit can be set "on" only at the 2 digit time of an E beat for any order in the group 60–67 owing to the inhibiting effect of the output from gate B160. If set "on," the trigger circuit is reset "off" again at the beginning of the next C beat by the ~C waveform input to the delay B18.

The presence of the "on" state of the J waveform, indicative of a jump operation, causes the breaking of the normal cycle of sequential selection and obeying of the series of orders contained in a group of order words located in sequential address locations of the high speed storage registers caused by the increase, by unity in each C period, of the number stored in the register constituted by the delay line A01, FIG. 4, as already described and the substitution, in the register constituted by such delay line A01, of an entirely different address number formed by the N digits of the jump order which is itself present at the time in the control line, FIG. 4. The facility permits the machine to decide which of two alternative courses of subsequent action shall be taken as a consequence of the result of a preceding calculation.

Thus, if the machine is currently operating with an order word obtained from address 68 in the high speed computing register and the A order of such order word is a jump order whose F digits specify, for example, the order code number 63 and whose N and X digits respectively specify, for example, register address 64 and accumulator register ACR2, then the resultant operation is one by which the number signal in accumulator register ACR2 is fed over bus bar Y44 and through delay B51 to the computing unit 5 and is tested therein for sign by examination of its sign digit (38) at the lower entry gate of delay B18. If the latter is of value "0," the trigger circuit around delay B18 will not be set "on," the J waveform will remain "off" and no jump operation will take place. In the following B period the B order of the same order word will be obeyed in the usual way followed, in the subsequent C period, by the selection of the next order word from address 69 (i.e. old 68+1) of the high speed computing register.

On the other hand, if the examined sign digit is of value "1," the trigger circuit around delay B18 will be set "on" and the J waveform will go "on." The presence of this J waveform at its "on" level and the corresponding "off" state of the ~J waveform modifies the form of the X19, X20 and X21 waveforms whereby the beat counter arrangements of FIG. 3 are set at the end of the current E beat to the C/D state while the N digits of the current order (i.e. those specifying register address 64) which are at the time present in the control line, FIG. 4, are fed back through the now-open lower entry gate of delay A21 for use, instead of the previous number stored in the register of delay line A01, to set the N digit staticisors to select the next order word. Such N digits are also fed, in the usual way, into the delay line A01 in replacement of the previous number whereby the new sequence of order words starts from the new address number (i.e. 64). The usual increase, by unity, of the address number is prevented by the closure of the lower entry gate of delay A61 since the X20 waveform is now continuously "off."

If desired it can be arranged, by making the n6 digit of such jump order of value "0" instead of its proper value "1" (denoting the register group 64–95), that the A order of the newly selected order word is not obeyed and that the B order only is used. In this case, the J waveform causes, effectively, the omission of the A order from the order pair circulating in the control line, FIG. 4, the machine merely executing two non-effective D and E beats of an A period in response to an A order which is composed entirely of "0" digits. This is effected as follows.

When the J waveform is "on" it is effective on delay A131, FIG. 4, whereby the ~I9 waveform from the control line is tested at digit time 7. The available digit at this instant is the n6 digit of the current order which, as already stated is made of value "0." In consequence of this, the inverse or ~I9 waveform will present an n6 digit of value "1" and the trigger circuit around delay A131 is accordingly set "on" to provide an "on" output to inverter A132 which accordingly tests the U15 waveform from delay A100 at the I9 digit time. The U15 waveform is present only during the D beat of a C period, i.e. the time when the next order word is being obtained, and when this occurs the output from inverter A132 is inhibited at the 19 digit time to set "off" the trigger circuit around delay A133 which provides the X15 waveform and which normally goes "on" at the 1 digit time of the D beat of the C period and remains "on" until the following 41 digit time. The X15 waveform therefore now goes "on" as usual at 1 digit time, but goes "off" at the end of the following 19 digit time.

This X15 waveform is the one controlling the input delay A41 through which the selected order word signal is arriving from the computing store 10 over bus bar Y40. As a result of the cessation of the "on" period of the X15 waveform at the 19 digit time, only those digits of the incoming order word present during digit times 1–19 of the D beat of the C period are allowed to pass to the control line. This group of digits is that of the first or B order of the order word. This B order accordingly passes to the control line in the usual way but the succeeding A order of the order word is replaced by a succession of 0 signals. The machine proceeds to interpret this blank A order as an operation to do nothing and after the ensuing idle D and E beats of the A period, the B order is brought into operation in the usual way and is obeyed. The effect is therefore one of a jump operation direct to the B order of the selected order word.

OPERATION—JUMP ORDER 64

Jump order 64 is one calling for a jump operation if the computing unit overflow staticisor is clear. Such an order provides, by reason of its F digit configuration, the G06 and G14 waveforms from the h F-digit staticisors. The G06 waveform will condition the lower entry gate of delay B18 in readiness to open. The G14 waveform, through mixer B110 and delay B06, will provide an "on" signal to one input of inverter B17 and one input of the lower entry gate of delay B18. The same G14 waveform, through mixer B120 and delay B16, will also provide an "on" signal to the opposite input of inverter B17 as well as to the lower entry gate of delay B18 provided the OVR waveform from the overflow staticisor of delay B38 is "on" as a result of overflow occurring in a previous operation within the mill 5.

Thus, if the overflow staticisor is clear and the OVR waveform accordingly "off," inverter B17 and delay B06 will each provide sustained signals to the lower entry gate of delay B18 whereby the trigger circuit therearound will be set "on" at 2 digit time of the E beat by the output from gate B160. The J waveform accordingly goes "on" and a jump operation is effected in the manner already described.

On the other hand, if the overflow staticisor is set on and the OVR waveform accordingly "on," each input of inverter B17 will be provided with an "on" input and its own output will be inhibited. This will prevent the lower entry gate of delay B18 from responding to the input from gate B160 and the J waveform will remain "off." No jump operation will then take place.

The X8 waveform from inverter B170 will go "off" at digit time 40 of the same E beat, thereby resetting the overflow staticisor of delay B38 "off" again, if it had previously been set.

OPERATION—JUMP ORDER 65

This order calls for a jump operation if the computing unit overflow staticisor is set. This order provides the G06 and G15 waveforms from the F-digit staticisors. The G06 waveform will condition the lower entry gate of delay B18 as in the case of order 64. The mixer B110 will not, however, provide an "on" output to delay B06 but the G15 waveform, through mixer B120, will condition the upper entry gate of delay B16 to open if the OVR waveform is "on."

Thus, if the overflow staticisor is "on" and the OVR waveform accordingly "on," delay B16 will provide an 'on' signal to one input of lower entry gate of delay B18 and to one input of inverter B17. The second input of the latter is not energised however and the inverter output remains "on." The lower entry gate of delay B18 is thus conditioned to admit the signal from gate B160 at digit time 2 of the E beat whereby the J waveform goes "on" and a jump operation follows.

Conversely, if the overflow staticisor is not set "on," neither of the delays B06, B16 will provide an "on" output and the trigger circuit around delay B18 will remain "off." No jump operation will take place.

The X8 waveform from inverter B170 again resets the overflow staticisors, "off" at the end of the E beat, if it had previously been set "on."

The overflow staticisor of the computing unit 5 is also used for controlling purposes in carrying out the "justify" order 23 in which the overflow digit is interpreted arithmetically to determine the sign on a number. Such a "justify" order will now be described.

OPERATION—JUSTIFY ORDER 23

The "justify" order 23 is one by which a word-length number signal representing the most significant half of a two-word length number and held in a chosen register of the computing store 10 may be corrected as to its sign and numerical value in accordance with the result of an addition or subtraction operation previously carried out with the word-length number signals representing respectively the least significant half of that number and another word-length number, such as the least significant half of another two word-length number whose most significant half is afterwards to be added or subtracted to or from the aforesaid and now corrected most significant half of the first number. In such two word-length working, the lower significant half number is always regarded as positive, the effective sign digit being that at the 38 digit position of the most significant half number.

There are three cases in which the previous addition or subtraction of the two word-length numbers of lower significance can require correction of the most significant half of the first number. These are:

A. When the initial word-length numbers are both positive and their combination produces an answer number in which a carry takes place from the most significant digit position (value "+½") into the sign digit position whose apparent value then becomes "−1". For example:

| Digit number | | | 39 | 38 | 37 | 36 | |
|---|---|---|---|---|---|---|---|
| Value | | | O/D | S/D | +½ | +¼ | |
| First number | | | 0 | 0 | 1 | 1 | = +¾ |
| Second number | | | 0 | 0 | 1 | 0 | = +½ |
| On addition produces | | | 0 | 1 | 0 | 1 | = +1¼ |

In this case the combination "1" and "0" for the sign and overflow digits 38, 39 has to be interpreted as of value "+1" an equivalent correction made to the most significant half of the first number by adding "+1" thereto and the sign digit 38 of the said initial answer number altered to "0."

B. When both of the initial word-length numbers are negative and their combination produces an answer number of a value equal to or less than "−1." For example:

| Digit number | 40 | 39 | 38 | 37 | 36 | |
|---|---|---|---|---|---|---|
| Value | | O/D | S/D | +½ | +¼ | |
| First number | | 1 | 1 | 1 | 1 | = −¼ |
| Second number | | 1 | 1 | 1 | 1 | = −¼ |
| On addition produces | 1 | 1 | 1 | 1 | 0 | = −½ |

In this case the combination "1" and "1" for the sign and overflow digits 38 and 39 respectively has to be interpreted as of value "−1," an appropriate correction made to the most significant half of the first number and the sign digit of the initial answer number altered to "0" while digits 38, 39 and 40 are altered to "0."

C. When both of the two initial word-length numbers are each negative and produce an answer number whose value is equal to or less than "−2" but greater than "−1." For example:

| Digit number | 40 | 39 | 38 | 37 | 36 | |
|---|---|---|---|---|---|---|
| Value | | O/D | S/D | +½ | +¼ | |
| First number | | 1 | 1 | 0 | 0 | = −1 |
| Second number | | 1 | 1 | 0 | 1 | = −¾ |
| On addition produces | 1 | 1 | 0 | 0 | 1 | = −1¾ |

In this case the combination of values "0" and "1" for the sign and overflow digits 38, 39 respectively has to be interpreted as the addition of "−2" to the most significant half of the first number and an appropriate correction has to be made to the most significant half of the first number and the digit 39 has to be altered to "0."

The above operations are effected under the control of the computing unit over-flow staticisor B38, FIG. 7 by means of the elements comprising inverter M54, double-entry gated delay M64, gate M74 and double-entry gated delay M83 of FIG. 8 and the double-entry gated delays Q36 and Q63 of the "q" register ACR7, FIG. 6c, to which, with this particular order, the answer number signal resulting from the combination of the initial word-length number of lower significance is applied.

The delay Q36, FIG. 6c, is arranged as a trigger circuit by back coupling its output to one of its input entry gates controlled by the ∼ E waveform. The opposite entry gate is controlled by the E and 40 digit time pulse waveforms and is fed with the answer signal circulating around the regenerative loop of the register. The signals at this point are two digit intervals late on standard machine time. In consequence the digit position 38, i.e. the sign digit position of the answer number, is tested at 40 digit time of the E beat and according to whether such sign digit is of value "1" or "0" so the trigger circuit is set "on" or "off" to supply the necessary controlling input over bus bar Y51 to the inverter M54 and delay M64, FIG. 8.

It will be understood that the overflow staticisor of the computing unit 5 has been either set "on" or not set as the case may be at substantially the same time by the same result signal as it passed around the circuits of the computing unit on its way to register ACR7.

Thus in case A noted above the overflow staticisor will be set since the overflow and sign digits of the result number differ while the trigger circuit around delay Q36 will also be set "on" as the sign digit of the result is value "1". Under these circumstances the input over bus bar Y51 to inverter M54 and the OVR waveform will each be "on" whereby the output from inverter M54 will be inhibited except during the time of the next following "1" digit time pulse. This resultant inhibition of the control input to each entry gate of the delay M64 except during the "1" digit time, prevents the OVR and the ∼1 digit time pulse waveforms at the right-hand entry gate of delay M64 from being effective to provide any output.

The input over bus bar Y51 to the left-hand entry gate is, however, continuously active whereby the pulse in "1" digit time from inverter M54 is passed through such left-hand entry gate and following gate M74 (now operated by the G02 waveform from the F-digit staticisor) as a control input to the further delay M83 which is controlled by the U50, and G13 waveforms. The latter is "on" since the order number has a units digit value 3. The U50 waveform is also "on" since the events are now occurring in the next following beat which is a D beat and the U50 waveform input is derived from unit delay N20 supplied with the D waveform. The entry gate of delay M83 is thus opened to allow the emission of a pulse which is now in digit time 3 to bus bar Y66 which it is applied as an input signal to delay B11 of the computing unit, FIG. 7. This pulse in 3 digit time is delayed a further digit time in the delay B11 to arrive at the input of the computing circuit CPC in 4 digit time, i.e. 3 digit intervals late on standard time. This digit pulse coincides in timing with the least significant or "0" position digit of the most significant half of the first number signal which is supplied at the same time from a selected register to the second input of the circuit CPC through delay B51 from the bus bar Y41 under the control of the G02 and G13 waveforms (order 23). Thus the required addition of "+1" is made in the output signal from the computing circuit prior to its circulation through the computing unit back to its register.

In the case B quoted above, the overflow staticisor of the computing unit will not be set "on," as the initial result signal does not exhibit overflow and sign digits (39, 38) of different form but the trigger circuit around delay Q36, FIG. 6c, will be set "on" as the sign digit 38 of such signal is of value "1." In consequence inverter M54 will provide a continuous output as will delay M64. In consequence of this a continuous series of "1" value digit signals will be emitted from delay M83 and these will be fed, as before, over bus bar Y66 to the input delay B11 of the computing unit. Such a signal comprising a series of "1" digits, when interpreted with relation to the value of the digits of the most significant half number simultaneously fed to the computing unit over bus bar Y41, is equivalent to the insertion of "−1."

In the third case C quoted above, the overflow staticisor of the computing unit will be set "on" as the overflow and sign digits (39, 38) of the initial answer signal differ, whereas the trigger circuit around delay Q36, FIG. 6c, will not be set "on" as the sign digit is now of value "0." In consequence of this the Y51 waveform will be "off" and inverter M54 will provide a continuous output. This will be effective on the right-hand entry gate of delay M64, now opened by the OVR waveform, to allow the ∼1 digit pulse waveform to pass to the output of delay M64 and thence through gate M74 and delay M83 as before to the input delay B11 of the computing unit. Such ∼1 waveform comprises a series of "1" digits at positions 0, 2, 3, 4 . . . of the signal and is accordingly equivalent to the provision of a "−2" value signal for addition to the most significant half of the first number simultaneously flowing to the computing unit over bus bar Y41.

OPERATION—ROUNDED RIGHT SHIFT

The operation of the machine during the rounded right shift order number 51 is as follows. In this order the X digits specify the accumulator register containing the number to be shifted and the N digits the number of places by which such number is to be right shifted with round-off at each shift step.

In each beat of the current A or B period, except the final E beat, the upper signal entry gate of double-entry unit delay A61, FIG. 4, is opened by the presence of the G05 waveform and the ~E waveform to permit entry of the T36 waveform generated in double-entry unit delay A164 and mixer A174. This waveform comprises a group of "1" pulses in digit times 32, 33 . . . 41 and these pass through delay A61 to the second input lead 68 of the adding circuit ADR1, associated with the control line, where they coincide in timing with digits n0, n1 . . . n6 and the succeeding three digit places of the order signal then flowing to the opposite lead 67 of the adding circuit.

The aforesaid N digits of the order are those specifying the number of places which the selected number signal is to be right shifted, for example, if the number is required to be shifted three places to the right, the N digit configuration will be 0000011 (reading from right to left). The addition of the group of "1" signals through delay A61 will have the effect of reducing the value of the N digit signal by 1 at each application, i.e. at each beat.

The ~I9 waveform output from the control line is applied to double-entry unit delay A166 which is arranged as a trigger circuit which is set "on" in each beat by the 0 digit time pulse waveform and which is reset "off" again, at the latest at the time of digit interval 11 of the same beat, by the ~11 digit time pulse waveform. Such trigger circuit will, however, be reset "off" at an earlier time if the ~I9 waveform contains any "0" value signal during the period concerned, i.e. digit intervals 1–10. Such a "0" signal will occur if any one of the N digits n0 . . . n6 of the circulating order have the value "1." It will be seen, therefore, that it is only when the configuration of such N digits has been reduced to zero that the T38 waveform output from delay A166 will still be "on" at 11 digit time. When this occurs during an order of the group 50–57, signalled by the "on" state of the G05 waveform, the trigger circuit around double-entry gated delay A176 is set "on" at 12 digit interval time by the 11 digit time pulse waveform applied thereto. The resultant "on" state of the X27 waveform output from this trigger circuit persists until the trigger circuit is reset "off" at digit time 40 by the ~40 digit time pulse waveform. This setting "on" of the X27 waveform does not occur until the above described addition of the group of digit time pulses 32 . . . 42 made through delay A161 has been effected a sufficient number of times to reduce the original N digit configuration to zero. It will thus be seen that a number of successive beats will follow the initial D beat depending upon the value of the N digits of the order and in each beat a right shift by one place will occur. When the X27 waveform is eventually set "on," indicative that the required number of stepping cycles has been completed, this waveform is applied as one source of the X81 waveform fed to the double-entry unit delay J134 of the beat counter arrangements in FIG. 3. This X81 waveform, as already explained, serves to initiate the E or final beat of the operative period by which the shifted number signal is returned to its original accumulator register.

During the first or D beat of the above described group of repeated beat cycles, the double-entry unit delay B51 of the computing unit, FIG. 7, is opened by the X5 waveform generated in mixer B140 and allows the signals present on the bus bar Y44, which carries the output from the register in the computing store 10 selected by the X digits of the order in the usual way, to pass through this delay B51 and through the further double-entry unit delay B52 to the second input terminal 65 of the computing circuit CPC of the mill. At the same time the lower entry gate of double-entry unit delay B12 is opened during the D beat by the X1 waveform derived from gate B100 supplied with the G05 and G11 waveforms. This admits a pulse in digit 2 time to the opposite input terminal 64 of the computing circuit CPC. This digit 2 time pulse, arriving in digit interval 3 at the terminal 64, coincides with a position in the number signal arriving from delay B52 which is one place still further to the right, i.e. of still lower significance, than that of the lowest significant digit of the number signal. The effect is therefore to insert a "1" signal to the right of the original lowest significant digit of the number. This number signal circulates through the computing circuit where no arithmetical operation is performed and thence passes by way of the 35-interval delay line B55 and further unit delays B56, B57, B58, B79 back to the double-entry unit delay B72 at the signal input which is opened by the G05 and G11 waveforms whereby the original number arrives back at the input terminal 65 of the computing circuit after a period time of only 41 digit intervals, i.e. one short of a standard word time. In consequence the whole number is effectively shifted one place to the right.

In the next beat the upper entry gate of the delay B12 is opened by the now present ~D waveform to admit a pulse in 1 digit time instead of the previous digit time pulse. This inserted 1 digit time pulse coincides in timing with the digit pulse of value "1" inserted through the same delay in the previous beat and a "carry" digit is accordingly generated when the two signals pass through the computing circuit CPC. This "carry" digit is accordingly added to the digit of the original number which was of lowest significance where it may or may not itself cause propagation of a further "carry" digit in the usual way depending upon the value of such original lowest significant digit. The number signal again circulates through the delay line B55 and further unit delays B56, B57, B58, B79 to pass again through the delay B72 at the next beat where, coupled with the insertion of a further 1 digit time pulse through delay B12, the operation is again repeated with the inserted digit coinciding, this time, with the position of the original lowest significant digit of the inserted number. The latter may, however, already have been modified as a result of the preceding cycle and the inserted digit pulse has the effect of allowing the propagation of a further "carry" digit in the ordinary way. The number again circulates through delay line B55, unit delays B56, B57, B58, B79 and a similar process is repeated for the total number of times required as set by the configuration of the N digits of the order.

At each circulation the digit of the signal occurring in 41 digit time at unit delay B79 becomes erased by the action of the ~41 waveform at that unit delay. At the same time, the signal which arrives at the output of delay B79 in 41 digit time, i.e. the sign digit of the original number at the first time of circulation, is applied also to unit delay B78 controlled by the 41 pulse waveform and arranged as a form of trigger circuit whereby the latter copies the original sign digit into the next succeeding digit position. This is to extend the sign digit at each place of right shifting so as to maintain the character of a negative number.

When the N digit configuration of the circulating order has been reduced to zero in the manner explained, indicating that the requisite number of right shift steps have been taken, the E beat becomes operative owing to the setting of the trigger circuit around double-entry unit delay J134 of the beat counter, FIG. 3. This causes a return to the normal form of operation of the machine whereby the signal output from the computing circuit is fed through delay line B55, unit delay B56 to the bus bar Y2 and thence back to the particular accumulator register of the high speed computing store which has been specified by the X digits of the order. At the same time, the ~E waveform at delay B79, now at its "off" level, blocks the regeneration loop of the mill to prevent the number being re-circulated back to the input side of the computing circuit.

OPERATION UNDER COUNTER ORDERS

Order number 40 ($x'=N.2^{-38}$), providing the operation of inserting in an accumulator register specified by the X digits of the order, a number specified by the N digits of the order, which N digits are to be placed at the least significant end of the inserted number word.

The order will have the F digit configuration 100000, an X digit configuration specifying the required accumulator, e.g. 011 for accumulator register number 3, an N digit configuration defining the required number as $N\times 2^{-38}$, for example 0000110, and any required M digit configuration. This will be regarded as 000.

Such order will be selected in the normal way and fed into the control line, FIG. 4, where it will set up the various N, X, F and M staticisors in the normal way.

In the D beat of the particular period A or B, as the case may be, the unit delay B21 is opened to allow the 110 output from the control line to flow to one input of the double-entry unit delay B32 which is also opened by the ~F3 waveform from the F staticisors. The selected order passing through the control line accordingly has 31–40 of the word and these comprise the digits $n0$, $n1$ . . . $n6$ and the three remaining digits which are normally value "0."

This signal, extracted from the order, then passes to the input terminal 64 of the computing circuit CPC. There is no input to the second input terminal of the computing circuit as the entry gates to this input are all closed. The extracted digits accordingly pass through the computing circuit without change and emerge from output terminal 66 and then flow through the 35-interval delay line B55 and unit delay B56 to the output bus bar Y2 of the computing unit and from thence in the uusal way to the particular accumulator register, e.g. register number 3, specified by the X digits of the order, the previous content of such register being automatically erased by the normal blocking of the regeneration loop. A number which corresponds to that originally identified by the N digits of the order is therefore inserted in such accumulator register.

Order number 41 ($x'=x+N.2^{-38}$), providing the addition of a number specified by the N digits of the order (regarded as $N.2^{-38}$) to the number already in the accumulator register specified by the X digits of the order.

The sequence of operations is similar to that previously described except that, in this case, the presence of the F5 waveform instead of the ~F5 waveform in combination with the ~F3 waveform, derived from the F staticisors, opens the signal entry through double-entry unit delay B42 to allow signals on the bus bar Y44, available through the signal entry of double-entry unit delay B41 opened by the ~F1 and ~F2 waveforms, to pass to the second input terminal 65 of the computing circuit CPC. In a manner similar to that previously described in connection with simple arithmetic orders 00–07, the signals at this time on the bus bar Y44 are those from the accumulator register defined by the X digits of the order. Such signal representing the existing content of the selected X register accordingly passed to the computing circuit simultaneously with the number represented by the N digits of the order and the computing circuit accordingly operates to effect addition of the two applied number signals whereby the output from the terminal 66 of the computing circuit represents the sum of the two represented numbers. This signal then flows as before through the delay line B55 and unit delay B56 to the bus bar Y2 and thence back to the same selected X register where such sum-representing signal is replaced in the register instead of the previous number.

The remaining orders of the number group 40–46 correspond with those of the number group 00–06 already referred to and the manner of operation will be self-evident.

While the invention has been particularly described with relation to an embodiment thereof operating with binary numbers expressed dynamically in serial form and with high access speed storage registers formed by magneto-strictive devices, it will be apparent to those skilled in the art that the invention is also applicable to other forms of machine, such as those operating with parallel mode signalling and with other forms of storage.

We claim:

1. An electronic digital computing machine which includes a main data store and a separate computing data store, transfer circuits including signal-controlled switch means between said main data store and said computing data store, computing circuit means for performing a computing operation with at least two operand-representing signals applied thereto from said computing data store, overflow detector means connected to said computing circuit means for detecting overflow of a derived answer-representing signal therein beyond the range of numbers capable of being represented by the form of electric signals employed in the machine, said overflow detector means including overflow signal generating means for providing a sustained overflow indicating signal subsequent to the detection of overflow, a control system governing the form of machine operation during each operation cycle in accordance with the form of an applied order signal, rhythm control means for causing continuous machine operation during a plurality of successive operation cycles each in accordance with the form of successive order signals of a programme of orders, said control system including transfer code signal generating means for providing a transfer code control signal connected to operate said signal controlled switch means in said transfer channels between said main data store and said computing data store in response to an order signal requiring a transfer operation, signal controlled stop means connected to said rhythm control means for arresting the cyclic operation of the machine and signal coincidence testing means having separate inputs supplied respectively with said transfer code control signal and said overflow indicating signal, said coincidence testing means having an output connected to operate said stop means to cause automatic arrest of continued cyclic operation of the machine to prevent the performance of a transfer operation between said main data store and said computing data store subsequent to the detection of overflow.

2. An electronic digital computing machine which includes a main data store, a separate computing data store, transfer channels including signal controlled switch means between said main data store and said computing data store, computing circuit means for performing any chosen one of a plurality of different types of computing operation with at least two operand-representing signals supplied thereto from said computing data store, said computing circuit means including division performing means rendered operable by a division code control signal, overflow detector means connected to said computing circuit means for detecting overflow of a derived answer-representing signal therein beyond the range of numbers capable of being represented by the form of electric signals employed in the machine, said overflow detector means including trigger circuit means for providing a sustained overflow indicating signal after overflow is detected, a control system governing the form of machine operation during each operation cycle in accordance with the form of an applied order signal, rhythm control means causing continued operation of the machine over a plurality of successive operation cycles, each in accordance with the successive order signals of a programme of orders, said control system including division code signal generating means for providing a division code control signal in response to an applied order signal requiring a division operation, transfer code signal generating means for providing a transfer code control signal in response to an applied order signal requiring transfer between said main data store and said computing data stores, signal controlled stop means connected to said rhythm control means for arresting the cyclic operation of the machine, first signal coincidence testing means having separate inputs supplied respectively with said division code control signal and said overflow signal, second signal coincidence testing means having separate inputs supplied respectively with said transfer code control signal and said overflow signal, the respective outputs of said first and second coincidence testing means each being applied to said stop means to cause automatic arrest of continued cyclic operation of the machine in the event of overflow during a division operation or at a transfer operation subsequent to an occurrence of overflow.

3. An electronic binary digital computing machine according to claim 2 arranged for operation with signed numbers and in which numbers of negative sign are signalled by the use of complement number-representing signals having a sign digit in the position of next greater significance than the most-significant digit of the positive portion of such number signal, wherein said overflow detector means comprises first and second digit signal selecting means for selecting the sign digit signal and the digit signal in the position of still greater significance than said sign digit in the answer-representing signal in said computing circuit means, a digit signal non-equivalence detecting circuit having separate inputs supplied respectively with the outputs of said first and second digit signal examining means, said non-equivalence detecting circuit providing a triggering input to said trigger circuit means providing said overflow indicating output signal for application to said stop means.

4. An electronic digital computing machine according to claim 3 which includes visual indicator means operated by said overflow signal.

5. An electronic digital computing machine according to claim 2 wherein said control system includes shift code signal generating means for providing a shift code control signal in response to an applied order signal requiring shifting of a number signal in said computing circuit means, said computing circuit means including signal controlled digit shift means and means for applying said shift code control signal to said digit shift means.

6. An electronic digital computing machine according to claim 5 in which said computing circuit means contains alternative right or left digit shift means each including signal controlled switch means and in which said control system includes shift direction code signal generating means for providing a shift direction code control signal for operating said switch means of said shift direction means.

7. An electronic digital computing machine according to claim 6 which includes a source of round-off digit signals and means for connecting said source to said computing circuit means as one operand-representing signal for combination with the shifted number signal to effect round-off at each shift step during a right shift operation.

8. An electronic binary digital computing machine arranged for operation with signed numbers and in which numbers of negative sign are signalled by the use of complement number-representing signals having a sign digit in the position of next greater significance than the most-significant digit of the positive portion of such number signal, said machine including computing circuit means for performing a computing operation with at least two operand-representing signals applied thereto, at least two separate sources of operand-representing signals, transfer circuit means connecting each of said sources to said computing circuit means, each of said transfer means including sign-digit signal copying means for copying the form of the sign digit of each operand-representing signal passing over said transfer paths into the next signal position of still greater significance than said sign digit prior to the application of said operand-representing signals to said computing circuit means and overflow detector means connected to said computing circuit means for detecting overflow of a derived answer-representing signal therein beyond the range of numbers capable of being represented by the form of electric signals employed in the machine, said overflow detector means including first and second digit signal selecting means for selecting respectively the sign digit signal and the digit signal in the position of still greater significance than said sign digit in the answer-representing signal in said computing circuit means, a digit signal comparing circuit having separate inputs supplied respectively with the outputs of said first and second digit signal selecting means, said signal comparing circuit providing an overflow indicating output signal which is indicative of whether said selected and compared digit signals are the same or are different in their respective values.

9. An electronic binary digital computing machine according to claim 8 for operation with word signals representative of numbers of $n$ digits length and including double-word length operating means by which computations with double-length or $2n$ digit numbers may be effected by a first operation with signals representing the least-significant $n$ digit half of each operand and a subsequent second operation with signals representing the most-significant $n$ digit half of each operand which includes oper-and-signal modifying arrangements for effecting modification of one of the most-significant half-operand signals prior to its use in said computing circuit means during said second operation to correct the resultant answer-representing signal in accordance with the value of overflow occurring during said first operation, said operand-signal modifying arrangements including sign-digit signal examining means for separately examining the value of the sign digit signal of the answer-representing signal resulting from said first operation, sign-digit indicator signal generating means connected to said sign-digit signal examining means and providing an output sign-digit indicator signal which is indicative of the value of said examined sign digit, a plurality of sources of different correction signals, selection switch means jointly controlled by said overflow indicating output signal and said sign-digit indicator signal for selectively connecting a chosen one only of said plurality of correction signal sources to said computing circuit means for combination with said most-significant half operand signal to produce the requisite modification of its value.

10. In an electronic digital computing machine which includes a data storage system, an accumulator register and a control system having control signal generating means providing machine operation control signals for governing the manner of operation of the machine during each operative cycle in accordance with the form of a function-defining portion of an applied order signal which order signal also includes at least one address number portion defining a storage location in said data storage system, which includes signal selecting means for selecting said address number portion of said order signal, counter order signal generating means for providing a counter order code control signal in response to an order whose function-defining portion calls for use of the number defined by said address defining portion as an operand signal for said accumulator register and signal transfer means including signal controlled switching means controlled by said counter order control signal connecting said signal selecting means with said accumulator register.

11. An electronic digital computing machine according to claim 10 for operation with orders and numbers each represented by serial mode pulse signal trains, in which said signal transfer means comprises a single signal transmission path including signal delay means, said signal delay means being of a time delay value whereby said transferred signal is registered in said accumulator register with a timing corresponding to the least-significant digits of the number signal contents of such register.

12. An electronic digital computing machine which includes computing circuit means for performing a computing operation with operand-representing signals applied thereto, said machine being operable with word signals representative of numbers of $n$ digits length and including double-word length operating means by which computations with double-length or $2n$ digit numbers may be effected by a first operation with signals representing the least-significant $n$ digit half of each operand and a subsequent second operation with signals representing the most-significant $n$ digit half of each operand, one of the most-significant half-operand signals being modified prior to its use in said computing circuit means during said second operation to correct the resultant answer-representing signal in accordance with the value of an overflow occurring during said first operation, overflow detector means connected to said computing circuit means for detecting overflow of a derived answer-representing signal in said computing circuit means beyond the range of numbers capable of being represented by the form of electric signals employed in the machine during said first operation, said overflow detector means including a signal generator for providing a sustained overflow indicating signal after overflow is detected, rhythm control means for causing repeated machine operation in successive operation cycles each with successive order signals of a program of orders, a control system for governing the form of machine operation during each operation cycle in accordance with the form of an applied order signal, said control system including justify code signal generating means for providing a justify code control signal in response to an order signal requiring correction of a number signal representing the most significant $n$ digit half of an operand in said computing circuit means in accordance with the overflow results of said first operation, a source of correction signals, coincidence testing means supplied with said overflow indicating signal and said justify code control signal to provide a correction control signal, and circuit means including signal-controlled switch means controlled by said correction control signal connecting said source of correction signals with said computing circuit means to send a correction signal to said computing circuit means for combination with said most-significant $n$ digit half operand signal to produce the requisite modification of its value.

References Cited in the file of this patent

UNITED STATES PATENTS

| | | |
|---|---|---|
| 2,749,037 | Stibitz | June 5, 1956 |
| 2,781,446 | Eckert et al. | Feb. 12, 1957 |
| 2,800,277 | Williams | July 23, 1957 |
| 2,902,217 | Davis | Sept. 1, 1959 |

FOREIGN PATENTS

| | | |
|---|---|---|
| 526,058 | Belgium | Feb. 15, 1954 |
| 1,084,147 | France | June 30, 1954 |

OTHER REFERENCES

Functional Description of the Edvac, Moore School of Electrical Engineering of the University of Pennsylvania, 1949, Vol. I, p. 4–24 to 4–40 and Vol. II, Figs. 104–3LD–2; 104–2LD5; 104–3LC–5.

"System Organization of the Dyseac," National Bureau of Standards Report No. 2893, August 1953, pp. 30, 34, 37, 38, and Fig. 1 relied on.

"The Alwac," Brochure by Logistics Research, Inc., recd. Dec. 2, 1953, pp. 2 and 8.

"The System Design of the IBM Type 701 Computer," Proc. IRE, October 1953, pp. 1269 to 1271.